United States Patent
Eryurek et al.

(10) Patent No.: US 6,907,383 B2
(45) Date of Patent: Jun. 14, 2005

(54) FLOW DIAGNOSTIC SYSTEM

(75) Inventors: Evren Eryurek, Minneapolis, MN (US); Kadir Kavaklioglu, Edina, MN (US)

(73) Assignee: Rosemount Inc., Eden Prairie, MN (US)

( * ) Notice: Subject to any disclaimer, the term of this patent is extended or adjusted under 35 U.S.C. 154(b) by 63 days.

(21) Appl. No.: 09/852,102

(22) Filed: May 9, 2001

(65) Prior Publication Data

US 2002/0029130 A1 Mar. 7, 2002

Related U.S. Application Data

(63) Continuation-in-part of application No. 09/257,896, filed on Feb. 25, 1999, now abandoned, which is a continuation-in-part of application No. 08/623,569, filed on Mar. 28, 1996, now Pat. No. 6,017,143, application No. 09/852,102, and a continuation-in-part of application No. 09/383,828, filed on Aug. 27, 1999, now Pat. No. 6,654,697.

(51) Int. Cl.$^7$ ................................................ G01F 1/34
(52) U.S. Cl. ...................... 702/183; 702/47; 702/100; 73/1.57; 73/1.71
(58) Field of Search .............................. 702/33, 43, 45, 702/46, 47, 48, 49, 98, 100, 104, 113, 114, 116, 135, 140, 153; 340/603, 606, 608, 611, 870.3; 73/1.57, 1.59, 1.63, 1.64, 1.66, 1.67, 1.69; 706/52, 906, 914

(56) References Cited

U.S. PATENT DOCUMENTS

| | | | |
|---|---|---|---|
| 3,096,434 A | 7/1963 | King ............................ | 702/46 |
| 3,404,264 A | 10/1968 | Kugler ......................... | 702/46 |
| 3,468,164 A | 9/1969 | Sutherland .................. | 374/142 |

(Continued)

FOREIGN PATENT DOCUMENTS

| | | |
|---|---|---|
| DE | 32 13 866 A1 | 10/1983 |
| DE | 35 40 204 C1 | 9/1986 |
| DE | 40 08 560 A1 | 9/1990 |

(Continued)

OTHER PUBLICATIONS

DAU Stat Refresher, "What is a weighted moving average?", http://cne.gmu.edu/modules/dau/stat/mvavgs/wma_bdy.html. (1995).*

Easton et al., "Statistics Glossary: Time series data", http://www.stats.gla.ac.uk/steps/glossary/time_series.html. Sep. 1997.*

"The Indicators Story", Sustainable Seattle, pp. 55–59, 1998.*

Clemins et al., "Detecting Regimes in Temperature Time Series", Artificial Neural Networks in Engineering, Proceedings, pp. 727–732, 2001.*

(Continued)

*Primary Examiner*—Marc S. Hoff
*Assistant Examiner*—Jeffrey R. West
(74) *Attorney, Agent, or Firm*—Westman, Champlin & Kelly, P.A.

(57) ABSTRACT

A flow diagnostic system for a flow sensing element and impulse lines. A pressure transmitter coupled to the impulse lines provides digital pressure data to a control system. The control system provides the pressure data and real time clock readings to a diagnostic application. The diagnostic application calculates a difference between current pressure data and its moving average. A condition of the primary element or impulse lines is diagnosed from a current pressure data set relative to an historical data set. The diagnostic application is downloadable from an application service provider (ASP). The application can run on the control system, a remote computer or the ASP. A diagnostic report is preferably provided.

40 Claims, 14 Drawing Sheets

U.S. PATENT DOCUMENTS

| | | | |
|---|---|---|---|
| 3,590,370 A | 6/1971 | Fleischer | 324/537 |
| 3,618,592 A | 11/1971 | Stewart et al. | 600/484 |
| 3,688,190 A | 8/1972 | Blum | 324/679 |
| 3,691,842 A | 9/1972 | Akeley | 73/718 |
| 3,701,280 A | 10/1972 | Stroman | 73/861.02 |
| 3,849,637 A | 11/1974 | Caruso et al. | 700/287 |
| 3,855,858 A | 12/1974 | Cushing | 73/861.17 |
| 3,952,759 A | 4/1976 | Ottenstein | 137/12 |
| 3,973,184 A | 8/1976 | Raber | 324/537 |
| RE29,383 E | 9/1977 | Gallatin et al. | 134/14 |
| 4,058,975 A | 11/1977 | Gilbert et al. | 60/39.281 |
| 4,099,413 A | 7/1978 | Ohte et al. | 374/175 |
| 4,102,199 A | 7/1978 | Talpouras | 374/167 |
| 4,122,719 A | 10/1978 | Carlson et al. | 374/167 |
| 4,249,164 A | 2/1981 | Tivy | 340/870.3 |
| 4,250,490 A | 2/1981 | Dahlke | 340/870.37 |
| 4,279,013 A | 7/1981 | Cameron et al. | 700/33 |
| 4,337,516 A | 6/1982 | Murphy et al. | 702/183 |
| 4,399,824 A | 8/1983 | Davidson | 600/549 |
| 4,417,312 A | 11/1983 | Cronin et al. | 700/282 |
| 4,517,468 A | 5/1985 | Kemper et al. | 290/52 |
| 4,528,869 A | 7/1985 | Kubo et al. | 475/71 |
| 4,530,234 A | 7/1985 | Cullick et al. | 73/19.02 |
| 4,571,689 A | 2/1986 | Hildebrand et al. | 702/58 |
| 4,635,214 A | 1/1987 | Kasai et al. | 702/183 |
| 4,642,782 A | 2/1987 | Kemper et al. | 706/53 |
| 4,644,479 A | 2/1987 | Kemper et al. | 702/185 |
| 4,649,515 A | 3/1987 | Thompson et al. | 706/52 |
| 4,668,473 A | 5/1987 | Agarwal | 422/62 |
| 4,686,638 A * | 8/1987 | Furuse | 364/558 |
| 4,707,796 A | 11/1987 | Calabro et al. | 702/34 |
| 4,720,806 A | 1/1988 | Schippers et al. | 702/187 |
| 4,736,367 A | 4/1988 | Wroblewski et al. | 340/3.51 |
| 4,736,763 A * | 4/1988 | Britton et al. | 137/10 |
| 4,777,585 A | 10/1988 | Kokawa et al. | 706/52 |
| 4,807,151 A | 2/1989 | Citron | 702/47 |
| 4,818,994 A | 4/1989 | Orth et al. | 340/870.21 |
| 4,831,564 A | 5/1989 | Suga | 702/34 |
| 4,841,286 A | 6/1989 | Kummer | 340/653 |
| 4,853,693 A | 8/1989 | Eaton-Williams | 340/588 |
| 4,873,655 A | 10/1989 | Kondraske | 702/86 |
| 4,907,167 A | 3/1990 | Skeirik | 700/10 |
| 4,924,418 A | 5/1990 | Bachman et al. | 702/188 |
| 4,926,364 A * | 5/1990 | Brotherton | 702/179 |
| 4,934,196 A | 6/1990 | Romano | 73/861.356 |
| 4,939,753 A | 7/1990 | Olson | 375/356 |
| 4,964,125 A | 10/1990 | Kim | 714/26 |
| 4,988,990 A | 1/1991 | Warrior | 340/825.5 |
| 4,992,965 A | 2/1991 | Holter et al. | 701/36 |
| 5,005,142 A | 4/1991 | Lipchak et al. | 702/183 |
| 5,019,760 A | 5/1991 | Chu et al. | 318/490 |
| 5,043,862 A | 8/1991 | Takahashi et al. | 700/42 |
| 5,053,815 A | 10/1991 | Wendell | 399/10 |
| 5,067,099 A | 11/1991 | McCown et al. | 702/183 |
| 5,081,598 A | 1/1992 | Bellows et al. | 702/184 |
| 5,089,979 A | 2/1992 | McEachern et al. | 702/91 |
| 5,089,984 A | 2/1992 | Struger et al. | 700/12 |
| 5,098,197 A | 3/1992 | Shepard et al. | 374/120 |
| 5,099,436 A | 3/1992 | McCown et al. | 702/82 |
| 5,103,409 A | 4/1992 | Shimizu et al. | 702/183 |
| 5,111,531 A | 5/1992 | Grayson et al. | 706/23 |
| 5,121,467 A | 6/1992 | Skeirik | 706/10 |
| 5,122,794 A | 6/1992 | Warrior | 340/825.2 |
| 5,122,976 A | 6/1992 | Bellows et al. | 702/185 |
| 5,130,936 A | 7/1992 | Sheppard et al. | 702/123 |
| 5,134,574 A | 7/1992 | Beaverstock et al. | 702/84 |
| 5,137,370 A | 8/1992 | McCullock et al. | 374/173 |
| 5,142,612 A | 8/1992 | Skeirik | 706/23 |
| 5,143,452 A | 9/1992 | Maxedon et al. | 374/170 |
| 5,148,378 A | 9/1992 | Shibayama et al. | 702/116 |
| 5,167,009 A | 11/1992 | Skeirik | 706/23 |
| 5,175,678 A | 12/1992 | Frerichs et al. | 700/47 |
| 5,193,143 A | 3/1993 | Kaemmerer et al. | 706/45 |
| 5,197,114 A | 3/1993 | Skeirik | 706/23 |
| 5,197,328 A | 3/1993 | Fitzgerald | 73/168 |
| 5,212,765 A | 5/1993 | Skeirik | 417/442 |
| 5,214,582 A | 5/1993 | Gray | 701/33 |
| 5,224,203 A | 6/1993 | Skeirik | 706/23 |
| 5,228,780 A | 7/1993 | Shepard et al. | 374/175 |
| 5,235,527 A | 8/1993 | Ogawa et al. | 702/116 |
| 5,265,031 A | 11/1993 | Malczewski | 702/24 |
| 5,265,222 A | 11/1993 | Nishiya et al. | 706/10 |
| 5,269,311 A | 12/1993 | Kirchner et al. | 600/485 |
| 5,274,572 A | 12/1993 | O'Neill et al. | 702/57 |
| 5,282,131 A | 1/1994 | Rudd et al. | 700/44 |
| 5,282,261 A | 1/1994 | Skeirik | 706/23 |
| 5,293,585 A | 3/1994 | Morita | 706/43 |
| 5,303,181 A | 4/1994 | Stockton | 365/96 |
| 5,305,230 A | 4/1994 | Matsumoto et al. | 700/287 |
| 5,311,421 A | 5/1994 | Nomura et al. | 700/37 |
| 5,317,520 A | 5/1994 | Castle | 702/58 |
| 5,327,357 A | 7/1994 | Feinstein et al. | 700/271 |
| 5,333,240 A | 7/1994 | Matsumoto et al. | 706/20 |
| 5,340,271 A * | 8/1994 | Freeman et al. | 415/1 |
| 5,347,843 A * | 9/1994 | Orr et al. | 73/1.34 |
| 5,349,541 A | 9/1994 | Alexandro, Jr. et al. | 703/19 |
| 5,357,449 A | 10/1994 | Oh | 702/188 |
| 5,361,628 A | 11/1994 | Marko et al. | 73/116 |
| 5,365,423 A | 11/1994 | Chand | 700/12 |
| 5,365,787 A | 11/1994 | Hernandez et al. | 73/660 |
| 5,367,612 A | 11/1994 | Bozich et al. | 706/23 |
| 5,384,699 A | 1/1995 | Levy et al. | 250/363.03 |
| 5,386,373 A | 1/1995 | Keeler et al. | 700/266 |
| 5,388,465 A | 2/1995 | Okaniwa et al. | 73/861.17 |
| 5,394,341 A | 2/1995 | Kepner | 702/183 |
| 5,394,543 A | 2/1995 | Hill et al. | 714/26 |
| 5,404,064 A | 4/1995 | Mermelstein et al. | 310/319 |
| 5,408,406 A | 4/1995 | Mathur et al. | 700/12 |
| 5,408,586 A | 4/1995 | Skeirik | 706/25 |
| 5,410,495 A * | 4/1995 | Ramamurthi | 702/100 |
| 5,414,645 A | 5/1995 | Hirano | 702/185 |
| 5,419,197 A | 5/1995 | Ogi et al. | 73/659 |
| 5,430,642 A | 7/1995 | Nakajima et al. | 700/50 |
| 5,434,774 A | 7/1995 | Seberger | 700/67 |
| 5,436,705 A | 7/1995 | Raj | 399/59 |
| 5,440,478 A | 8/1995 | Fisher et al. | 700/109 |
| 5,442,639 A | 8/1995 | Crowder et al. | 714/712 |
| 5,467,355 A | 11/1995 | Umeda et al. | 702/184 |
| 5,469,070 A | 11/1995 | Koluvek | 324/713 |
| 5,469,156 A | 11/1995 | Kogura | 340/870.38 |
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/705 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 700/32 |
| 5,488,697 A | 1/1996 | Kaemmerer et al. | 706/46 |
| 5,489,831 A | 2/1996 | Harris | 318/701 |
| 5,495,769 A * | 3/1996 | Broden et al. | 73/718 |
| 5,510,779 A | 4/1996 | Maltby et al. | 340/870.3 |
| 5,511,004 A | 4/1996 | Dubost et al. | 702/183 |
| 5,526,293 A | 6/1996 | Mozumder et al. | 716/19 |
| 5,539,638 A | 7/1996 | Keeler et al. | 701/29 |
| 5,548,528 A | 8/1996 | Keeler et al. | 702/22 |
| 5,560,246 A | 10/1996 | Bottinger et al. | 73/861.15 |
| 5,561,599 A | 10/1996 | Lu | 700/44 |
| 5,570,300 A | 10/1996 | Henry et al. | 702/45 |
| 5,572,420 A | 11/1996 | Lu | 700/33 |
| 5,573,032 A | 11/1996 | Lenz et al. | 137/486 |
| 5,591,922 A * | 1/1997 | Segeral et al. | 73/861.04 |

| | | | |
|---|---|---|---|
| 5,598,521 A | 1/1997 | Kilgore et al. ............... 345/804 |
| 5,600,148 A | 2/1997 | Cole et al. ................ 250/495.1 |
| 5,608,650 A | 3/1997 | McClendon et al. ......... 702/114 |
| 5,623,605 A | 4/1997 | Keshav et al. .............. 709/236 |
| 5,633,809 A | 5/1997 | Wissenbach et al. ......... 702/45 |
| 5,637,802 A | 6/1997 | Frick et al. ................... 73/724 |
| 5,640,491 A | 6/1997 | Bhat et al. .................... 706/25 |
| 5,661,668 A | 8/1997 | Yemini et al. .............. 702/186 |
| 5,665,899 A | 9/1997 | Willcox ....................... 73/1.63 |
| 5,669,713 A | 9/1997 | Schwartz et al. ............... 374/1 |
| 5,671,335 A | 9/1997 | Davis et al. ................... 706/25 |
| 5,675,504 A | 10/1997 | Serodes et al. ............... 702/25 |
| 5,675,724 A | 10/1997 | Beal et al. ...................... 714/4 |
| 5,680,109 A * | 10/1997 | Lowe et al. ................. 340/608 |
| 5,682,317 A | 10/1997 | Keeler et al. ............... 701/101 |
| 5,700,090 A | 12/1997 | Eryurek ....................... 374/210 |
| 5,703,575 A | 12/1997 | Kirpatrick .............. 340/870.17 |
| 5,704,011 A | 12/1997 | Hansen et al. ................ 706/25 |
| 5,705,978 A | 1/1998 | Frick et al. .................. 340/511 |
| 5,708,211 A * | 1/1998 | Jepson et al. ............. 73/861.04 |
| 5,708,585 A | 1/1998 | Kushion ...................... 701/108 |
| 5,710,370 A * | 1/1998 | Shanahan et al. ............. 73/1.35 |
| 5,713,668 A | 2/1998 | Lunghofer et al. .......... 374/179 |
| 5,719,378 A | 2/1998 | Jackson, Jr. et al. ........ 219/497 |
| 5,736,649 A | 4/1998 | Kawasaki et al. ........ 73/861.23 |
| 5,741,074 A | 4/1998 | Wang et al. ................. 374/185 |
| 5,742,845 A | 4/1998 | Wagner ......................... 710/11 |
| 5,746,511 A | 5/1998 | Eryurek et al. ................. 374/2 |
| 5,747,701 A | 5/1998 | Marsh et al. ............ 73/861.23 |
| 5,752,008 A | 5/1998 | Bowling ....................... 703/13 |
| 5,764,539 A * | 6/1998 | Rani .......................... 702/130 |
| 5,764,891 A | 6/1998 | Warrior ........................ 710/72 |
| 5,781,878 A | 7/1998 | Mizoguchi et al. .......... 701/109 |
| 5,790,413 A * | 8/1998 | Bartusiak et al. ........... 700/174 |
| 5,801,689 A | 9/1998 | Huntsman ................... 345/733 |
| 5,805,442 A | 9/1998 | Crater et al. .................... 700/9 |
| 5,817,950 A * | 10/1998 | Wiklund et al. ......... 73/861.66 |
| 5,828,567 A * | 10/1998 | Eryurek et al. .............. 700/79 |
| 5,829,876 A | 11/1998 | Schwartz et al. ............... 374/1 |
| 5,848,383 A | 12/1998 | Yunus ........................ 702/102 |
| 5,859,964 A | 1/1999 | Wang et al. ................... 714/48 |
| 5,876,122 A | 3/1999 | Eryurek ....................... 374/183 |
| 5,880,376 A | 3/1999 | Sai et al. .................. 73/861.08 |
| 5,887,978 A | 3/1999 | Lunghofer et al. .......... 374/179 |
| 5,908,990 A * | 6/1999 | Cummings ............... 73/861.22 |
| 5,923,557 A | 7/1999 | Eidson ........................ 700/129 |
| 5,924,086 A | 7/1999 | Mathur et al. ................. 706/25 |
| 5,926,778 A | 7/1999 | Pöppel ........................ 702/130 |
| 5,936,514 A | 8/1999 | Anderson et al. ...... 340/310.01 |
| 5,940,290 A | 8/1999 | Dixon ............................ 700/9 |
| 5,956,663 A | 9/1999 | Eryurek et al. .............. 702/183 |
| 5,970,430 A | 10/1999 | Burns et al. ................. 702/122 |
| 6,014,902 A | 1/2000 | Lewis et al. .............. 73/861.12 |
| 6,016,523 A | 1/2000 | Zimmerman et al. ......... 710/63 |
| 6,016,706 A | 1/2000 | Yamamoto et al. ............ 73/727 |
| 6,017,143 A | 1/2000 | Eryurek et al. ................ 700/51 |
| 6,023,399 A | 2/2000 | Kogure ......................... 361/23 |
| 6,038,579 A * | 3/2000 | Sekine ......................... 708/400 |
| 6,045,260 A | 4/2000 | Schwartz et al. ............. 374/183 |
| 6,047,220 A | 4/2000 | Eryurek et al. ................ 700/28 |
| 6,047,222 A | 4/2000 | Burns et al. .................. 700/79 |
| 6,052,655 A | 4/2000 | Kobayashi et al. .......... 702/184 |
| 6,072,150 A | 6/2000 | Sheffer .................. 219/121.83 |
| 6,112,131 A | 8/2000 | Ghorashi et al. ........... 700/142 |
| 6,119,047 A | 9/2000 | Eryurek et al. ................ 700/28 |
| 6,119,529 A * | 9/2000 | Di Marco et al. ....... 73/861.68 |
| 6,139,180 A | 10/2000 | Usher et al. .................... 374/1 |
| 6,151,560 A | 11/2000 | Jones .......................... 702/58 |
| 6,182,501 B1 * | 2/2001 | Furuse et al. .................. 73/49.2 |
| 6,192,281 B1 | 2/2001 | Brown et al. ................... 700/2 |
| 6,195,591 B1 | 2/2001 | Nixon et al. .................. 700/83 |
| 6,199,018 B1 | 3/2001 | Quist et al. .................... 702/34 |
| 6,236,948 B1 * | 5/2001 | Eck et al. ...................... 702/45 |
| 6,263,487 B1 | 7/2001 | Stripf et al. ................ 717/171 |
| 6,298,377 B1 | 10/2001 | Hartikainen et al. ........ 709/223 |
| 6,311,136 B1 | 10/2001 | Henry et al. ................... 702/45 |
| 6,327,914 B1 * | 12/2001 | Dutton .................. 73/861.356 |
| 6,347,252 B1 | 2/2002 | Behr et al. ...................... 700/3 |
| 6,360,277 B1 | 3/2002 | Ruckley et al. .............. 709/250 |
| 6,370,448 B1 | 4/2002 | Eryurek ....................... 700/282 |
| 6,397,114 B1 | 5/2002 | Eryurek et al. ................ 700/51 |
| 6,425,038 B1 | 7/2002 | Sprecher ..................... 710/269 |
| 6,480,793 B1 * | 11/2002 | Martin ........................ 702/45 |
| 2002/0145568 A1 * | 10/2002 | Winter ....................... 343/701 |

FOREIGN PATENT DOCUMENTS

| | | | |
|---|---|---|---|
| DE | 43 43 747 | 6/1994 | |
| DE | 44 33 593 A1 | 6/1995 | |
| DE | 195 02 499 A1 | 8/1996 | |
| DE | 296 00 609 U1 | 3/1997 | |
| DE | 197 04 694 A1 | 8/1997 | |
| DE | 19930660 A1 | 7/1999 | |
| DE | 299 17 651 U1 | 12/2000 | |
| EP | 0 122 622 A1 | 10/1984 | |
| EP | 0 413 814 A1 | 2/1991 | |
| EP | 0 487 419 A2 | 5/1992 | |
| EP | 0 512 794 A2 | 5/1992 | |
| EP | 0 594 227 A1 | 4/1994 | |
| EP | 0 624 847 A1 | 11/1994 | |
| EP | 0 644 470 A2 | 3/1995 | |
| EP | 0 825 506 A2 | 7/1997 | |
| EP | 0 827 096 A2 | 9/1997 | |
| EP | 0 838 768 A2 | 9/1997 | |
| EP | 0 807 804 A2 | 11/1997 | |
| EP | 1058093 A1 | 5/1999 | |
| EP | 1 022 626 A2 | 7/2000 | |
| FR | 2 302 514 | 9/1976 | |
| FR | 2 334 827 | 7/1977 | |
| GB | 928704 | 6/1963 | |
| GB | 1 534 280 | 11/1978 | |
| GB | 2 310 346 A | 8/1997 | |
| GB | 2 342 453 A * | 4/2000 | ............ G01D/4/00 |
| GB | 2342453 | 4/2000 | |
| GB | 2347232 | 8/2000 | |
| JP | 58-129316 | 8/1983 | |
| JP | 59-116811 | 7/1984 | |
| JP | 59163520 | 9/1984 | |
| JP | 59-211196 | 11/1984 | |
| JP | 59-211896 | 11/1984 | |
| JP | 60-507 | 1/1985 | |
| JP | 60000507 | 1/1985 | |
| JP | 60-76619 | 5/1985 | |
| JP | 60-131495 | 7/1985 | |
| JP | 60174915 | 9/1985 | |
| JP | 62-30915 | 2/1987 | |
| JP | 64-1914 | 1/1989 | |
| JP | 64001914 | 1/1989 | |
| JP | 64-72699 | 3/1989 | |
| JP | 2-5105 | 1/1990 | |
| JP | 03229124 | 11/1991 | |
| JP | 5-122768 | 5/1993 | |
| JP | 06242192 | 9/1994 | |
| JP | 7-63586 | 3/1995 | |
| JP | 07234988 | 9/1995 | |
| JP | 07294356 A * | 11/1995 | ............ G01L/19/00 |
| JP | 8-54923 | 2/1996 | |
| JP | 08114638 A * | 5/1996 | ............ G01R/31/00 |
| JP | 8-136386 | 5/1996 | |
| JP | Hei8/1996-136386 | 5/1996 | ............ G01L/27/04 |
| JP | 8-166309 | 6/1996 | |
| JP | Hei8/1996-166309 | 6/1996 | ............ G01L/13/00 |

| | | | | |
|---|---|---|---|---|
| JP | 08247076 | 9/1996 | | |
| JP | 2712625 | 10/1997 | | |
| JP | 2712701 | 10/1997 | | |
| JP | 2753592 | 3/1998 | | |
| JP | 07225530 | 5/1998 | | |
| JP | 10-232170 | 9/1998 | | |
| JP | 11083575 | 3/1999 | | |
| JP | 3129121 | 11/2000 | ………. | G01L/27/00 |
| JP | 3139597 | 12/2000 | ………. | G01L/19/00 |
| JP | 3147275 | 12/2000 | ………. | G01L/13/00 |
| WO | WO 94/25933 | 11/1994 | | |
| WO | WO 96/11389 | 4/1996 | | |
| WO | WO 96/12993 | 5/1996 | | |
| WO | WO 96/39617 | 12/1996 | | |
| WO | WO 97/21157 | 6/1997 | | |
| WO | WO 97/25603 | 7/1997 | | |
| WO | WO 98/06024 | 2/1998 | | |
| WO | WO 98/13677 | 4/1998 | | |
| WO | WO 98/20469 | 5/1998 | | |
| WO | WO 98/39718 | 9/1998 | | |
| WO | WO 99/19782 | 4/1999 | | |
| WO | WO 00/55700 | 9/2000 | | |
| WO | WO 00/70531 | 11/2000 | | |

OTHER PUBLICATIONS

The Math Forum, "Re: Digital Filter–Moving Average", http://mathforum.org/discuss/sci.math/a/t/177212. Sep. 28, 1998.*

IEEE Transactions on Magnetics, vol. 34, No. 5, Sep. 1998, "Optical Design of the Coils of an Electromagnetic Flow Meter," pp. 2563–2566.

IEEE Transactions on Magnetics, vol. 30, No. 2, Mar. 1994, "Magnetic Fluid Flow Meter for Gases," pp. 936–938.

IEEE Instrumentation and Measurement, "New approach to a main error estimation for primary transducer of electromagnetic flow meter," pp. 1093–1097.

"Additional Information From Flowmeters via Signal Analysis," by J.E. Ammadi–Echendu and E.H. Higham, pp. 187–193.

International Search Report for International Application No. PC/US 02/14934, filed May 8, 2002, Search Report dated Apr. 28, 2002.

International Search Report for International Application No. PCT/US 02/14560, filed May 8, 2002, Search Report dated Sep. 3, 2002.

"Notification of Transmittal of the International Search Report or the Declaration" for PCT/US01/40791.

"Notification of Transmittal of the International Search Report or the Declaration" for PCT/US01/40782.

"Improving Dynamic Performance of Temperature Sensors With Fuzzy Control Techniques," by Wang Lei et al., pp. 872–873 (1992).

Journal of Intelligent Manufacturing (1997) 8, 271–276 article entitled "On–line tool condition monitoring system with wavelet fuzzy neural network".

"A TCP/IP Tutorial" by, Socolofsky et al., Spider Systems Limited, Jan. 1991 pp. 1–23.

"Approval Standards For Explosionproof Electrical Equipment General Requirements", Factory Mutual Research, C1. No. 3615, Mar. 1989, pp. 1–34.

"Approval Standard Intrinsically Safe Apparatus and Associated Apparatus For Use In Class I, II, and III, Division 1 Hazardous (Classified) Locations", Factory Mutual Research, C1. No. 3610, Oct. 1988, pp. 1–70.

"Automation On–line" by, Phillips et al., Plant Services, Jul. 1997, pp. 41–45.

"Climb to New Heights by Controlling your PLCs Over the Internet" by, Phillips et al., Intech, Aug. 1998, pp. 50–51.

"ComProcessor For Piezoresistive Sensors", MCA Technologies Inc. (MCA7707), pp. 1–8.

"Ethernet emerges as viable, inexpensive fieldbus", Paul G. Schreier, Personal Engineering, Dec. 1997, pp. 23–29.

"Ethernet Rules Closed–loop System" by, Eidson et al., Intech, Jun. 1998, pp. 39–42.

"Fieldbus Standard for Use in Industrial Control Systems Part 2: Physical Layer Specification and Service Definition", ISA–S50.02–1992, pp. 1–93.

"Fieldbus Standard for Use in Industrial Control Systems Part 3: Data Link Service Definition", ISA–S50.02–1997, Part 3, Aug. 1997, pp. 1–159.

Fieldbus Standard For Use in Industrial Control Systems Part 4: Data Link Protocol Specification, ISA–S50.02–1997, Part 4, Aug. 1997, pp. 1–148.

"Fieldbus Support For Process Analysis" by, Blevins et al., Fisher–Rosemount Systems, Inc., 1995, pp. 121–128.

"Fieldbus Technical Overview Understanding FOUNDATION™ fieldbus technology", Fisher–Rosemount, 1998, pp. 1–23.

"Hypertext Transfer Protocol—HTTP/1.0" by, Berners–Lee et al., MIT/LCS, May 1996, pp. 1–54.

"Infranets, Intranets, and the Internet" by, Pradip Madan, Echelon Corp, Sensors, Mar. 1997, pp. 46–50.

"Internet Technology Adoption into Automation" by, Fondl et al., Automation Business, pp. 1–5.

"Internet Protocol Darpa Internet Program Protocol Specification" by, Information Sciences Institute, University of Southern California, RFC 791, Sep. 1981, pp. 1–43.

"Introduction to Emit", emWare, Inc., 1997, pp. 1–22.

"Introduction to the Internet Protocols" by, Charles L. Hedrick, Computer Science Facilities Group, Rutgers University, Oct. 3, 1988, pp. 1–97.

"Is There A Future For Ethernet in Industrial Control?", Miclot et al., Plant Engineering, Oct. 1988, pp. 44–46, 48, 50.

LFM/SIMA Internet Remote Diagnostics Research Project Summary Report, Stanford University, Jan. 23, 1997, pp. 1–6.

"Managing Devices with the Web" by, Howard et al., Byte, Sep. 1997, pp. 45–64.

"Modular Microkernal Links GUI And Browser For Embedded Web Devices" by, Tom Williams, pp. 1–2.

"PC Software Gets Its Edge From Windows, Components, and the Internet", Wayne Labs, I&CS, Mar. 1997, pp. 23–32.

Proceedings Sensor Expo, Aneheim, California, Produced by Expocon Management Associates, Inc., Apr. 1996, pp. 9–21.

Proceedings Sensor Expo, Boston, Massachusettes, Produced by Expocon Management Associates, Inc., May 1997, pp. 1–416.

"Smart Sensor Network of the Future", by, Jay Warrior, Sensors, Mar. 1997, pp. 40–45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1–78.

"On–Line Statistical Process Control for a Glass Tank Ingredient Scale," by R.A. Weisman, *IFAC real Time Programming*, 1985, pp. 29–38.

"The Performance of Control Charts for Monitoring Process Variation," by C. Lowry et al., *Commun. Statis.—Simula.*, 1995, pp. 409–437.

"A Knowledge–Based Approach for Detection and Diagnosis of Out–of–Control Events in Manufacturing Processes," by P. Love et al., *IEEE*, 1989, pp. 736–741.

"Advanced Engine Diagnostics Using Universal Process Modeling", by P. O'Sullivan, Presented at the *1996 SAE Conference on Future Transportation Technology*, pp. 1–9.

Parallel, Fault–Tolerant Control and Diagnosis System for Feedwater Regulation in PWRS, by E. Eryurek et al., *Proceedings of the American Power Conference.*

"Programmable Hardware Architectures for Sensor Validation", by M.P. Henry et al., *Control Eng. Practice*, vol. 4, No. 10., pp. 1339–1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040–1047.

"Signal Processing, Data Handling and Communications: The Case for Measurement Validation", by M.P. Henry, *Department of Engineering Science, Oxford University.*

"Smart Temperature Measurement in the '90s", by T. Kerlin et al., *C&I*, (1990).

"Software–Based Fault–Tolerant Control Design for Improved Power Plant Operation," *IEEE/IFAC Joint Symposium on Computer–Aided Control System Design*, Mar. 7–9, 1994 pp. 585–590.

A Standard Interface for Self–Validating Sensors, by M.P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artificial Neural Networks to Identify Nuclear Power Plant States," by Israel E. Alguindigue et al., pp. 1–4.

"Application of Neural Computing Paradigms for Signal Validation," by B.R. Upadhyaya et al., *Department of Nuclear Engineering*, pp. 1–18.

"Application of Neural Networks for Sensor Validation and Plant Monitoring," by B. Upadhyaya et al., *Nuclear Technology*, vol. 97, No. 2, Feb. 1992 pp. 170–176.

"Automation Generation of Nonlinear System Characterization for Sensor Failure Detection," by B.R. Upadhyaya et al., *ISA*, 1989 pp. 269–274.

"In Situ Calibration of Nuclear Plant Platinum Resistance Thermometers Using Johnson Noise Methods," *EPRI*, Jun. 1983.

"Johnson Noise Thermometer for High Radiation and High–Temperature Environments," by L. Oakes et al., *Fifth Symposium on Space Nuclear Power Systems*, Jan. 1988, pp. 2–23.

"Development of a Resistance Thermometer For Use Up to 1600 °C", by M.J. de Groot et al., *CAL Lab*, Jul./Aug. 1996, pp. 38–41.

"Survey, Applications, And Prospects of Johnson Noise Thermometry," by T. Blalock et al., *Electrical Engineering Department*, 1981 pp. 2–11.

"Noise Thermometry for Industrial and Metrological Applications at KFA Julich," by H. Brixy et al., 7th International Symposium on Temperature, 1992.

"Johnson Noise Power Thermometer and its Application in Process Temperature Measurement," by T.V. Blalock et al., *American Institute of Physics* 1982, pp. 1249–1259.

"Field–based Architecture is Based on Open Systems, Improves Plant Performance", by P. Cleaveland, *I&CS*, Aug. 1996, pp. 73–74.

"Tuned–Circuit Dual–Mode Johnson Noise Thermometers," by R.L. Shepard et al., Apr. 1992.

"Tuned–Circuit Johnson Noise Thermometry," by Michael Roberts et al., $7^{th}$ Symposium on Space Nuclear Power Systems, Jan. 1990.

"Smart Field Devices Provide New Process Data, Increase System Flexibility," by Mark Boland, *I&CS*, Nov. 1994, pp. 45–51.

"Wavelet Analysis of Vibration, Part I: Theory[1]," by D.E. Newland, *Journal of Vibration and Acoustics;* vol. 116, Oct. 1994, pp. 409–416.

"Wavelet Analysis of Vibration, Part 2: Wavelet Maps," by D.E. Newland, *Journal of Vibration and Acoustics*, vol. 116, Oct. 1994, pp. 417–425.

"Development of a Long–Life, High–Reliability Remotely Operated Johnson Noise Thermometer," by R.L. Shepard et al., *ISA*, 1991, pp. 77–84.

"Application of Johnson Noise Thermometry to Space Nuclear Reactors," by M.J. Roberts et al., Presented at the 6th Symposium on Space Nuclear Power Systems, Jan. 9–12, 1989.

"A Decade of Progress in High Temperature Johnson Noise Thermometry," by T.V. Blalock et al., *American Institute of Physics*, 1982 pp. 1219–1223.

"Sensor and Device Diagnostics for Predictive and Proactive Maintenance", by B. Boynton, A Paper Presented at the Electric Power Research Institute—Fossil Plant Maintenance Conference in Baltimore, Maryland, Jul. 29–Aug. 1, 1996, pp. 50–1–50–6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310–1314.

"Detecting Blockage in Process Connections of Differential Pressure Transmitters", by E. Taya et al., *SICE*, 1995, pp. 1605–1608.

"Development and Applications of Neural Network Algorithms For Process Diagnostics," by B.R. Upadhyaya et al., *Proceedings of the 29th Conference on Decision and Control*, 1990, pp. 3277–3282.

"A Fault–Tolerant Interface for Self–Validating Sensor", by M.P. Henry, *Colloquium*, pp. 3/1–3/2 (Nov. 1990).

"Fuzzy Logic and Artificial Neural Networks for Nuclear Power Plant Applications", by R.C. Berkan et al., *Proceedings of the American Power Conference.*

"Fuzzy Logic and Neural Network Applications to Fault Diagnosis", by P. Frank et al., *International Journal of Approximate Reasoning*, (1997), pp. 68–88.

"Keynote Paper: Hardware Compilation—A New Technique for Rapid Prototyping of Digital Systems–Applied to Sensor Validation", by M.P. Henry, *Control Eng. Practice*, vol. 3, No. 7., pp. 907–924, (1995).

"The Implications of Digital Communications on Sensor Validation", by M. Henry et al., *Report No. QUEL 1912/92*, (1992).

"In–Situ Response Time Testing of Thermocouples", *ISA*, by H.M. Hashemian et al., Paper No. 89–0056, pp. 587–593, (1989).

"An Integrated Architecture For Signal Validation in Power Plants," by B.R. Upadhyaya et al., *Third IEEE International Symposium on Intelligent Control,* Aug. 24–26, 1988, pp. 1–6.

"Integration of Multiple Signal Validation Modules for Sensor–Monitoring," by B. Upadhyaya et al., *Department of Nuclear Engineering,* Jul. 8, 1990, pp. 1–6.

"Intelligent Behavior for Self–Validating Sensor", by M.P. Henry, *Advances In Measurement,* pp. 1–7, (May 1990).

"Measurement of the Temperature Fluctuation in a Resistor Generating 1/F Fluctuation," by S. Hashiguchi, *Japanese Journal of Applied Physics,* vol. 22, No. 5, Part 2, May 1983, pp. L284–L286.

"Check of Semiconductor Thermal Resistance Elements by the Method of Noise Thermometry", by A. B. Kisilevskii et al., *Measurement Techniques,* vol. 25, No. 3, Mar. 1982, New York, USA, pp. 244–246.

"Neural Networks for Sensor Validation and Plant Monitoring," by B. Upadhyaya, *International Fast Reactor Safety Meeting,* Aug. 12–16, 1990, pp. 2–10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.,* vol. 45, No. 2, (Feb. 1974) pp. 151–162.

"Thermocouple Continuity Checker," IBM Technical Disclosure Bulletin, vol. 20, No. 5, pp. 1954 (Oct. 1977).

"A Self–Validating Thermocouple," Janice C–Y et al., IEEE Transactions on Control Systems Technology, vol. 5, No. 2, pp. 239–253 (Mar. 1997).

*Instrument Engineers' Handbook,* Chapter IV entitled "Temperature Measurements," by T.J. Claggett, pp. 266–333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1–14, Rosemount Inc. (1997).

Warrior, J., "The Collision Between the Web and Plant Floor Automation," 6th WWW Conference Workshop on Embedded Web Technology, Santa Clara, CA (Apr. 7, 1997).

Microsoft Press Computer Dictionary, 3rd Edition, p. 124.

"Internet Statistical Quality Control for Quality Monitoring Instruments", by P. Girling et al., *ISA,* 15 pgs., 1999.

Web Pages from www.triant.com (3 pgs.).

"Statistical Process Control (Practice Guide Series Book)", *Instrument Society of America,* 1995, pp. 1–58 and 169–204.

"Time Frequency Analysis of Transient Pressure Signals for a Mechanical Heart Valve Cavitation Study," *ASAIO Journal,* by Alex A. Yu et al., vol. 44, No. 5, pp. M475–M479, (Sep.–Oct. 1998).

"Transient Pressure Signals in Mechanical Heart Valve Caviation," by Z.J. Wu et al., pp. M555–M561 (undated).

"Caviation in Pumps, Pipes and Valves," *Process Engineering,* by Dr. Ronald Young, pp. 47 and 49 (Jan. 1990).

"Quantification of Heart Valve Cavitation Based on High Fidelity Pressure Measurements," *Advances in Bioengineering 1995,* by Laura A. Garrison et al., BED–vol. 28, pp. 297–298 (Nov. 6–11, 1994).

"Monitoring and Diagnosis of Cavitation in Pumps and Valves Using the Wigner Distribution," *Hydroaccoustic Facilities, Instrumentation, and Experimental Techniques,* NCA–vol. 10, pp. 31–36 (1991).

"Developing Predictive Models for Cavitation Erosion," *Codes and Standards in A Global Environment,* PVP–vol. 259, pp. 189–192 (1993).

"Self–Diagnosing Intelligent Motors: A Key Enabler for Next Generation Manufacturing System," by Fred M. Discenzo et al., pp. 3/1–3/4 (1999).

"A Microcomputer–Based Instrument for Applications in Platinum Resistance Thermomety," by H. Rosemary Taylor and Hector A. Navarro, Journal of Physics E. Scientific Instrument, vol. 16, No. 11, pp. 1100–1104 (1983).

"Experience in Using Estelle for the Specification and Verification of a Fieldbus Protocol: FIP," by Barretto et al., Computer Networking, pp. 295–304 (1990).

"Computer Simulation of H1 Field and Bus Transmission," by Utsumi et al., Advances in Instrumentation and Control, vol. 46, Part 2, pp. 1815–1827 (1991).

"Progress in Fieldbus Developments for Measuring and Control Application," by A. Schwaier, Sensor and Acuators, pp. 115–119 (1991).

"Ein Emulationssytem zur Leistungsanalyse von Feldbussystemen, Teil 1," by R. Hoyer, pp. 335–336 (1991).

"Simulators Integrato: Controllo su bus di campo," by Barabino et al., Automazione e Strumentazione, pp. 85–91 (Oct. 1993).

"Ein Modulares, verteiltes Diagnose–Expertensystem für die Fehlerdiagnose in lokalen Netzen," by Jürgen M. Schröder, pp. 557–565 (1990).

"Fault Diagnosis of Fieldbus Systems," by Jügen Quade, pp. 477–581 (Oct. 1992).

"Ziel und Anwendungen vol Feldbussystemem," by T. Pfeifer et al., pp. 549–557 (Oct. 1987).

"PROFIBUS–Infrastrukturmaßnahmen," by Tilo Pfeifer et al., pp. 416–419 (Aug. 1991).

"Simulation des Zeitverhaltens vol Feldbussystem," by O. Schnelle, pp. 440–442 (1991).

"Mod´´lisation et simulation d'un bus de terrain: FIP," by Song et al, pp. 5–9, (undated).

"Feldbusnetz für Automatisierungssysteme mit intelligenten Funktionseinheiten," by W. Kriesel et al., pp. 486–489 (1987).

"Bus de campo para la inteconexión del proceso con sistemas digitales de control," Technologia, pp. 141–147 (1990).

"Dezentrale Installation mit Echtzeit–Feldbus," Netzwerke, Jg. Nr.3 v. 14.3, 4 pages (1990).

"Process Measurement and Analysis," by Liptak et al., Instrument Engineers' Handbook, Third Edition, pp. 528–530, (1995).

"Microsoft Press Computer Dictionary" 2nd Edition, 1994, Microsoft Press, p. 156.

Eryurek et al., U.S. patent application Ser. No. 09/855,179, May 14, 2001.

Eryurek et al., U.S. patent application Ser. No. 09/852,102, May 9, 2001.

U.S. Appl. No. 10/893,144, Brown et al., filed Jul. 2004.

* cited by examiner

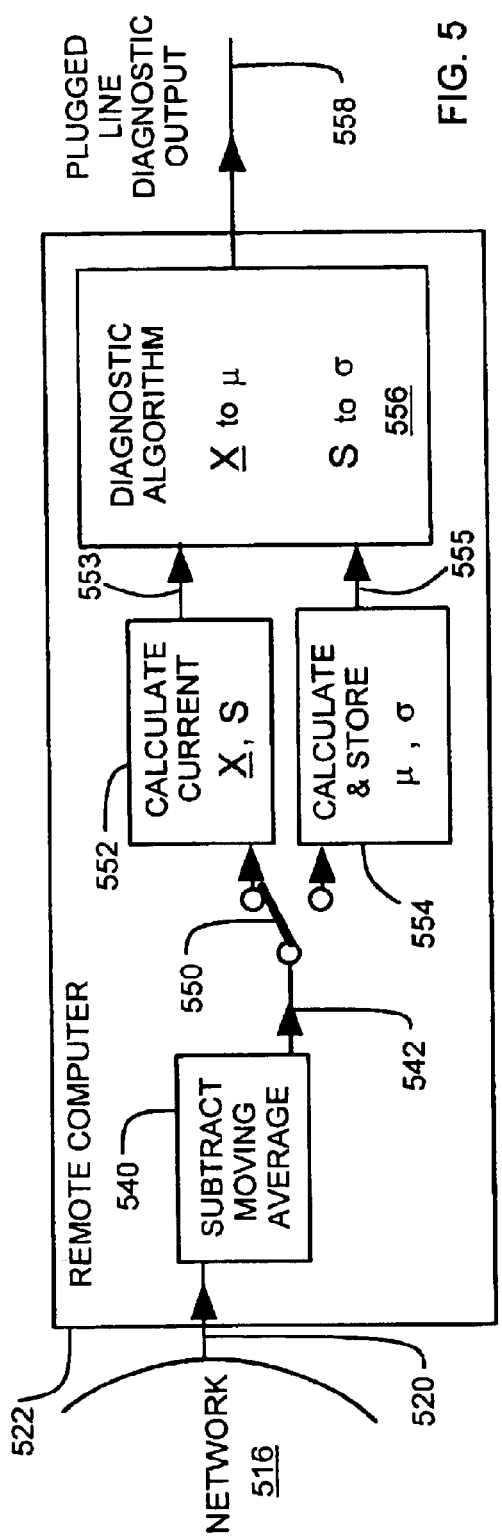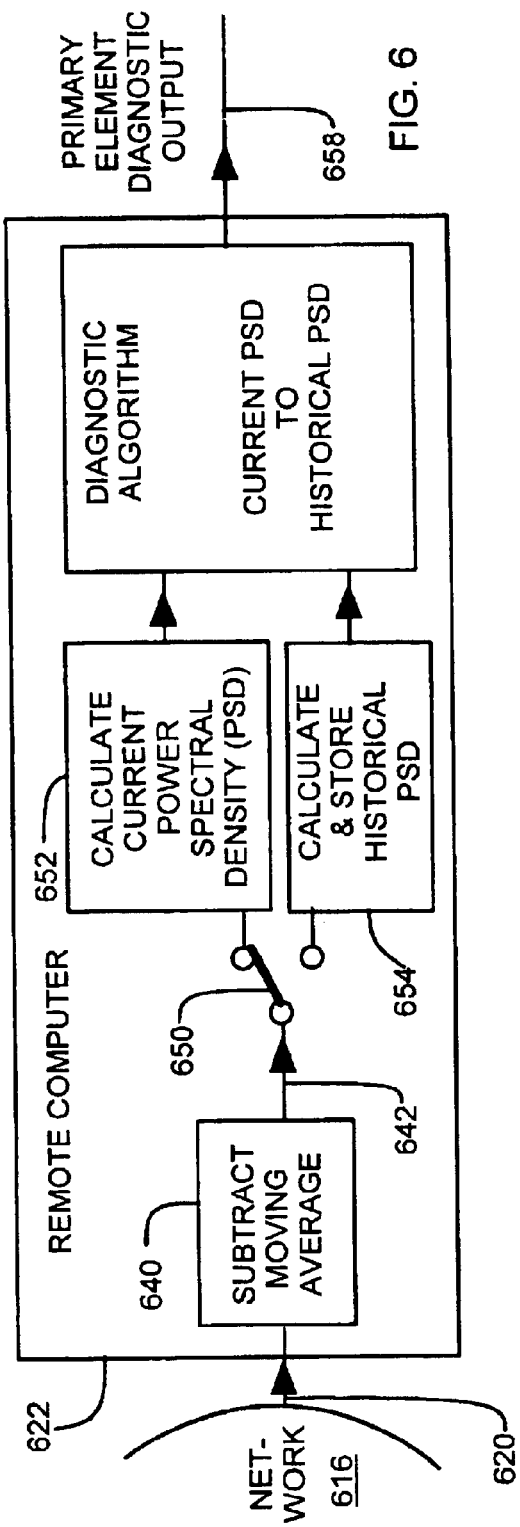

FLOW DIAGNOSTIC SYSTEM

CROSS-REFERENCE TO RELATED APPLICATIONS

This is a Continuation-In-Part of U.S. application Ser. No. 09/257,896, filed Feb. 25, 1999 now abandoned which is a Continuation-In-Part of U.S. application Ser. No. 08/623,569, filed Mar. 28, 1996, now U.S. Pat. No. 6,017,143, and this application is also a Continuation-In-Part of U.S. application Ser. No. 09/383,828, filed Aug. 27, 1999 now U.S. Pat. No. 6,654,697.

FIELD OF THE INVENTION

The present invention relates to fluid process control systems. In particular, the present invention relates to diagnostic systems for fluid flow in process control systems.

BACKGROUND OF THE INVENTION

Fluid flow meters are used in industrial process control environments to measure fluid flow and provide flow signals for flow indicators and controllers. Inferential flow meters measure fluid flow in a pipe by measuring a pressure drop near a discontinuity within the pipe. The discontinuity (primary element) can be an orifice, a nozzle, a venturi, a pitot tube, a vortex shedding bar, a target or even a simple bend in the pipe. Flow around the discontinuity causes both a pressure drop and increased turbulence. The pressure drop is sensed by a pressure transmitter (secondary element) placed outside the pipe and connected by impulse lines or impulse passageways to the fluid in the pipe. Reliability depends on maintaining a correct calibration. Erosion or buildup of solids on the primary element can change the calibration. Impulse lines can become plugged over time, which also adversely affects calibration.

Disassembly and inspection of the impulse lines is one method used to detect and correct plugging of lines. Another known method for detecting plugging is to periodically add a "check pulse" to the measurement signal from a pressure transmitter. This check pulse causes a control system connected to the transmitter to disturb the flow. If the pressure transmitter fails to accurately sense the flow disturbance, an alarm signal is generated indicating line plugging. Another known method for detecting plugging is sensing of both static and differential pressures. If there is inadequate correlation between oscillations in the static and differential pressures, then an alarm signal is generated indicating line plugging. Still another known method for detecting line plugging is to sense static pressures and pass them through high pass and low pass filters. Noise signals obtained from the filters are compared to a threshold, and if variance in the noise is less than the threshold, then an alarm signal indicates that the line is blocked.

These known methods rely on providing static pressure sensors or disassembly of the flow meter, increasing complexity and reducing reliability. These known methods do not provide for diagnosing the condition of the primary element. There is thus a need for a better diagnostic technology providing more predictive, less reactive maintenance for reducing cost or improving reliability.

SUMMARY OF THE INVENTION

A flow diagnostic system is disclosed for coupling to a primary flow sensing element via impulse lines. The flow diagnostic system may include a pressure transmitter that couples to the impulse lines and generates digital pressure data representing pressure.

A control system receives the pressure data and provides the pressure data and real time clock readings associated with pressure data to a diagnostic application stored in the flow diagnostic system.

The diagnostic application includes a first algorithm that calculates a difference between the pressure data and a moving average of the pressure data.

The diagnostic application also includes a second algorithm that receives the difference and calculates a trained data set of historical pressure data during a training mode and calculates a current pressure data set during a monitoring mode and then generates diagnostic data as a function of the current pressure data set relative to the historical pressure data, which indicates changes in the condition of flow sensing.

The diagnostic application includes a third algorithm that generates a report indicating the diagnostic data.

The diagnostic application can be provided over a network from an application service provider (ASP) or other source and can run on the control system, the ASP or another remote computer.

BRIEF DESCRIPTION OF THE DRAWINGS

FIG. 5 is a block diagram of a diagnostic application that diagnoses the condition of impulse lines.

FIG. 6 is a block diagram of a diagnostic application that diagnoses the condition of a primary flow element.

DETAILED DESCRIPTION OF THE PREFERRED EMBODIMENTS

In the present invention, a flow diagnostic system is provided that can diagnose the condition of either the primary element or impulse lines connected to a pressure transmitter. A diagnostic application is downloadable over a network from an application service provider (ASP), or can be obtained from a computer-readable medium such as a CD-ROM or removable disc. The diagnostic application can run on the control system, a remote computer or the ASP and provide a diagnostic report. The diagnostic application runs on a processor that is high powered relative to the low power embedded processor found in the pressure transmitter. With the use of the high powered processor, sophisticated diagnostics can be performed in real time and provide prompt reports to a plant operator about the condition of primary elements or impulse lines or both. There is no need to use processing time on the processor imbedded in the transmitter for diagnostics, and the transmitter can perform its measurement tasks rapidly.

Figure 1:
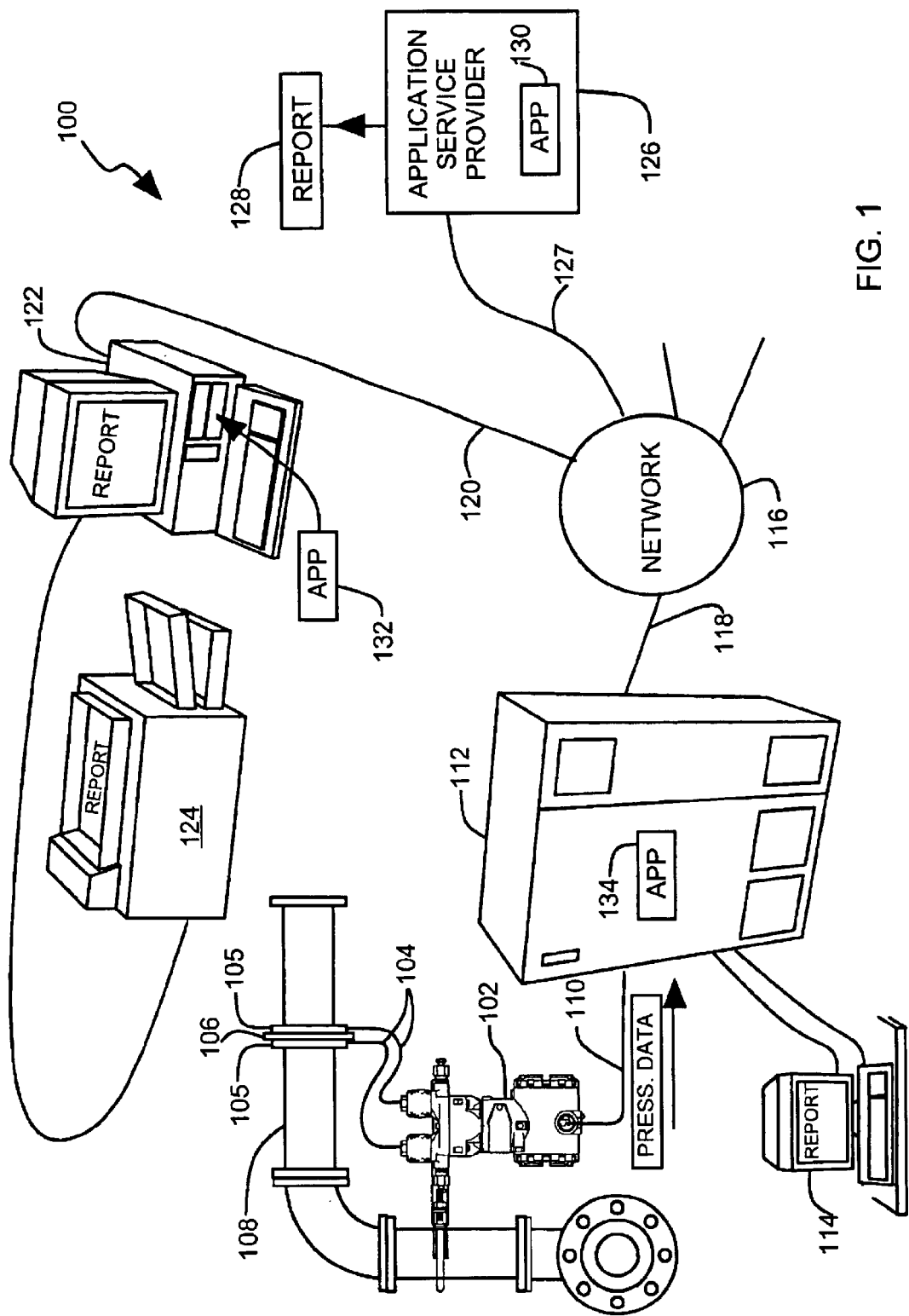
FIG. 1 is a schematic illustration of a flow diagnostic system that diagnoses the condition of impulse lines and/or a primary flow element.

FIG. 1 is a schematic illustration of a generalized example of a flow diagnostic system 100 that diagnoses the condition of impulse lines 104 and/or a primary flow element 106 placed in a fluid piping system 108. The impulse lines 104 and the primary element 106 are referred to collectively as a "pressure generator."

The term "pressure generator" as used in this application means a primary element (e.g., an orifice plate, a pitot tube, a nozzle, a venturi, a shedding bar, a bend in a pipe or other flow discontinuity adapted to cause a pressure drop in flow) together with impulse pipes or impulse passageways that couple the pressure drop from locations near the primary element to a location outside the flow pipe. The spectral and statistical characteristics of this pressure presented by this defined "pressure generator" at a location outside the flow pipe to a connected pressure transmitter 102 can be affected by the condition of the primary element as well as on the condition of the impulse pipes. The connected pressure transmitter can be a self-contained unit, or it can be fitted with remote seals as needed to fit the application. A flange on the pressure transmitter 102 (or its remote seals) couples to a flange adapter on the impulse lines 104 to complete the pressure connections in a conventional manner. The pressure transmitter 102 couples to a primary flow element 106 via impulse lines 104 to sense flow. Primary element 106, as illustrated, is an orifice plate clamped between pipe flanges 105.

Pressure transmitter 102 is coupled to the impulse lines 104 and provides pressure data along line 110 to a control system 112. Pressure transmitter 102 is preferably a differential pressure transmitter. Line 110 is typically a conventional 4–20 mA loop that provides all of the electrical energization for transmitter 102 and also carries digital pressure data representing the pressure sensed by pressure transmitter 102. Pressure transmitter 102 includes an embedded microprocessor that generates the digital pressure data, however, the computing power of the embedded microprocessor is limited by the power available from the 4–20 mA loop. The digital pressure data is typically transmitted in a standard industry format using a digital protocol such as HART, Foundation Fieldbus, Profibus, CAN or the like.

Control system 112 receives the digital pressure data on line 110 and providing the pressure data and real time clock readings associated with pressure data to a diagnostic application stored in the flow diagnostic system 100.

As explained in more detail below, the diagnostic application can be a application 134 that is stored in and running on a processor in control system 112, an application 130 stored in and running on a processor at an application service provider 126, an application 132 stored in and running on a processor in a remote computer 122 or any combination of these locations. In each of these locations, relatively high power computing is available in comparison to the limited computing power available from the embedded processor in transmitter 102. An arrangement where the diagnostic application is stored on one computer (112, 122 or 126) and running on another one of the computers (112, 122, 126) is also contemplated.

The diagnostic application (134, 130, 132 or a combination of 134, 130 or 132) includes a first algorithm calculating a difference between the pressure data and a moving average of the pressure data. The diagnostic application further includes a second algorithm receiving the difference and calculating a trained data set of historical pressure data during a training mode and calculating a current pressure data set during a monitoring mode and generating diagnostic data as a function of the current pressure data set relative to the historical pressure data indicating changes in the condition of flow sensing. The diagnostic application also includes a third algorithm generating a report indicating the diagnostic data. The report can be presented to an user at control system monitor 114, a printer 124 or monitor associated with remote computer 122 or a report 128 generated by the application service provider 126. It is appreciated that the report can take a variety of forms or displays that communicate the diagnostic data to the user.

The control system 112 couples along line 118 to a network 116. Network 116 also couples along line 120 to the remote computer 122, and couples along line 127 to the application service provider 126. Typically, the remote computer 122 is located in the offices of the plant operator, while the line 127 is a long distance connection, typically over the internet, to an application service provider 126 at any desired location.

The network 116 can provide the diagnostic application to the control system 112 or the remote computer 122. The network can also provide the pressure data and associated real time clock readings to the diagnostic application running at the remote computer 122 or the application service provider 126.

The illustration in FIG. 1 is a generalized illustration, and not all diagnostics systems include all of the features shown in FIG. 1.

Figure 2:
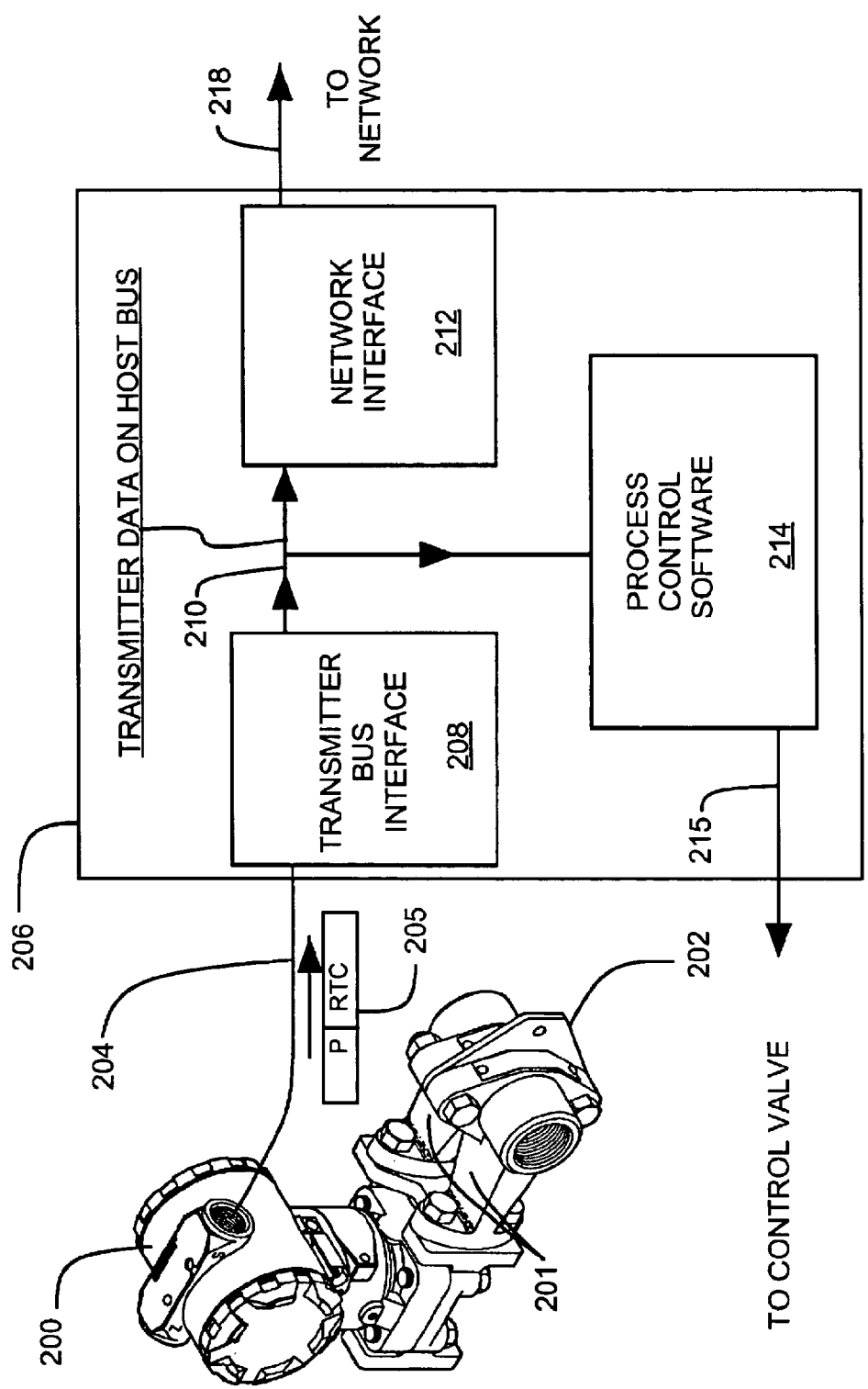
FIG. 2 is a schematic illustration of a first embodiment of a control system that is part of a flow diagnostic system.

FIG. 2 is a schematic illustration of a first embodiment of a control system 206 that is part of a flow diagnostic system such as flow diagnostic system 100 in FIG. 1.

Pressure transmitter 200 is coupled via impulse lines 201 to an integral orifice plate 202 in a fluid flow system. Pressure transmitter 200 couples to control system 206 along line 204. The pressure transmitter generates digital pressure data (P) and associated digital real time clock readings (RTC) as illustrated at 205. The real time clock readings provided by the transmitter 200 with each pressure reading indicate the relative time that each pressure reading is taken by the transmitter 200. In an instance where the transmitter generates pressure readings at a generally constant rate, the real time clock reading can be as simple as a sequential number for each reading. In an instance where the pressure reading are somewhat more irregularly spaced in time, the real time clock reading can be an approximate time that each reading taken.

The control system 206 receives the digital information 205 at a transmitter bus interface 208. Transmitter bus interface 208 formats the data properly for communication on the bus 210 that is internal to the control system 206. The information 205 is used by process control software 214 to couple control signals along line 215 to a valve or other control device. Control system 206 includes a network interface 212 that can pass the digital information 205 along to a network on line 218 in a case where the diagnostic application is not running on the control system 206. In a case where the diagnostic application is running on the control system 206, the network interface 212 can receive the diagnostic application from line 218 and format it for transmission over the bus 210. The network interface 212 is bidirectional. The control system 206 includes a processor, random access memory, non-volatile memory and I/O devices.

In FIG. 2, the transmitter 200 provides real time clock readings. As explained below in connection with FIG. 3, a flow diagnostic system can also operate with a transmitter that does not provide real time clock readings.

Figure 3:
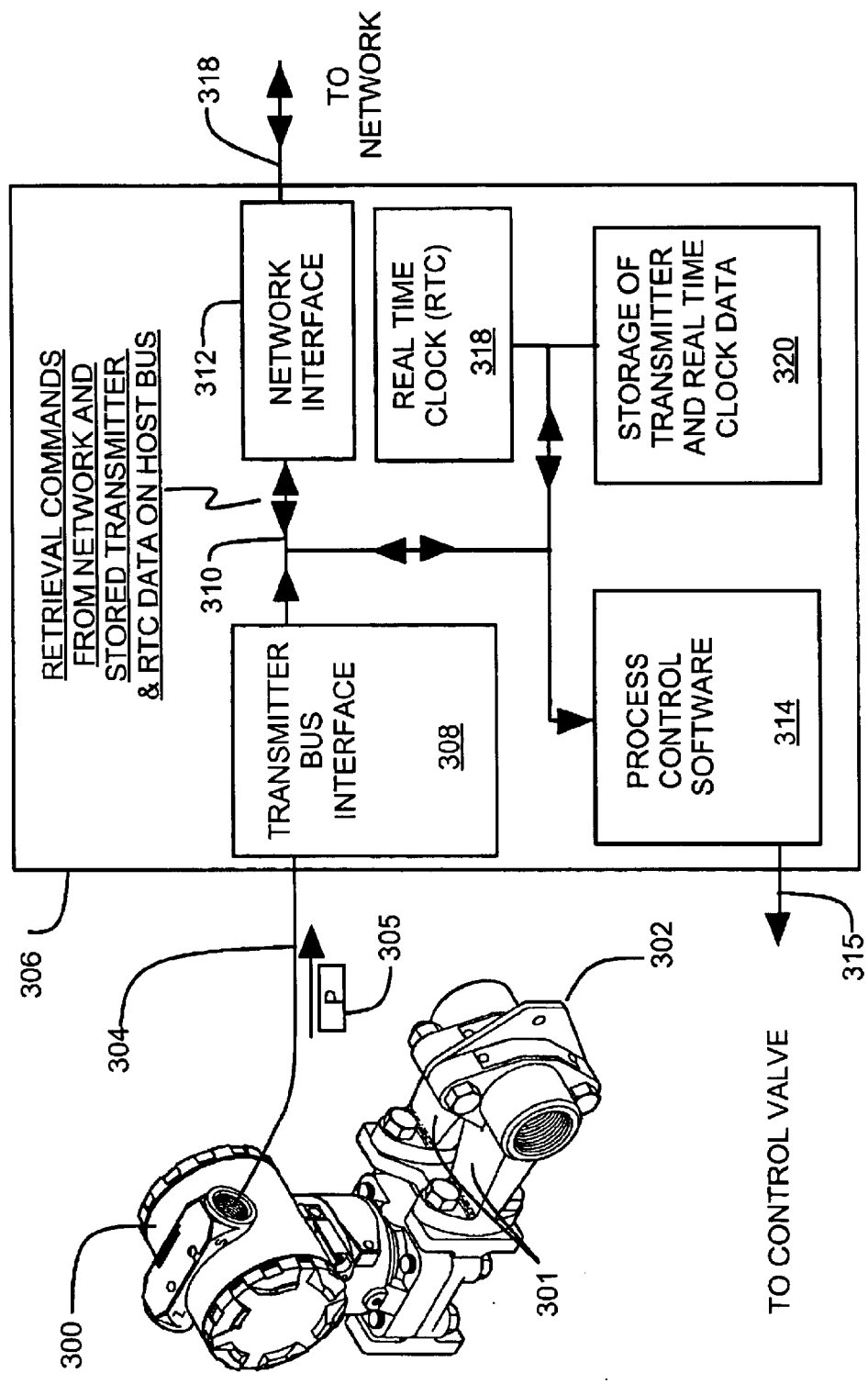
FIG. 3 is a schematic illustration of a second embodiment of a control system that is part of a flow diagnostic system.

FIG. 3 is a schematic illustration of a second embodiment of a control system 306 that is part of a flow diagnostic system such as flow diagnostic system 100 in FIG. 1.

Pressure transmitter 300 is coupled via impulse lines 301 to an integral orifice plate 302 in a fluid flow system. Pressure transmitter 300 couples to control system 306 along line 304. The pressure transmitter generates digital pressure data (P) as illustrated at 305. Transmitter 300 may or may not generate real time clock readings, depending on the design of the transmitter.

In an instance where the transmitter 300 generates real time clock readings, these reading are coupled through transmitter bus interface 308 to real time clock circuit 318 via a bus 310 that is internal to control system 306. Real time clock circuit 318 then generates a corresponding synchronized real time clock reading that is synchronized with other real time clock readings in the control system 306. This synchronization allows for synchronized comparison of data from multiple transmitters, for example, in a case where differential pressure is measured using two absolute pressure transmitters.

In an instance where transmitter 300 does not generate any usable real time clock readings, then real time clock circuit 318 generates synchronized real time clock readings based on the time that the each pressure data point 305 is received by real time clock circuit 318.

In either instance, the pressure data and synchronized real time clock readings can be used by process control software 314 to couple control signals along line 315 to a valve or other control device. Control system 306 includes a network interface 312 that can pass digital information (pressure data 305 and synchronized real time clock readings) along to a network on line 318 in a case where the diagnostic application is not running on the control system 306. If the network connected to line 318 is busy or otherwise unavailable, then the digital information can be temporarily stored in storage device 320 and later transmitted via the network to a diagnostic application running on a remote computer. This storage 320 can also be used in instances where it is desired to use batch processing for diagnostics.

In a case where the diagnostic application is running on the control system 306, the network interface 312 can receive the diagnostic application from line 318 and format it for transmission over the bus 310 internal to control system 306.

Figure 4:
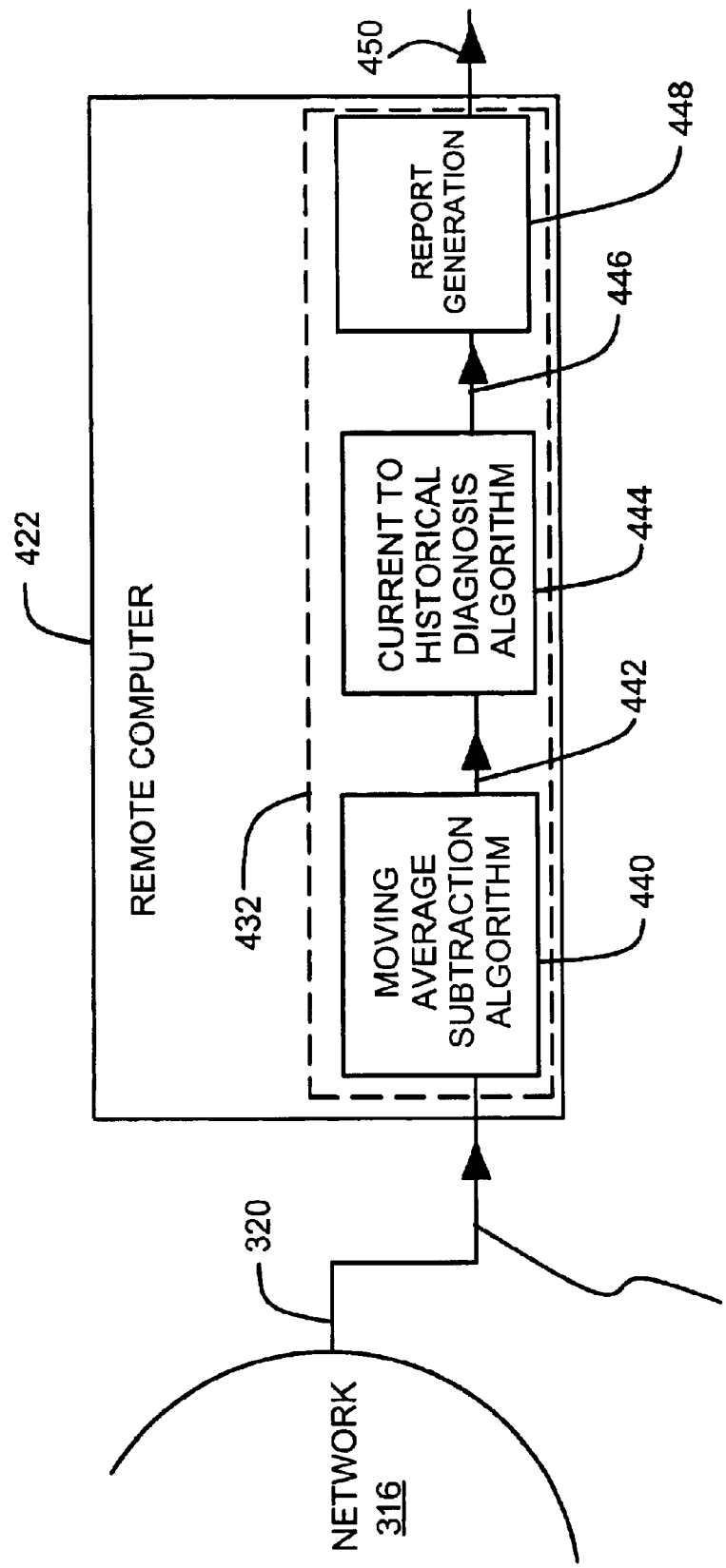
FIG. 4 is a block diagram of a diagnostic application.

FIG. 4 is a block diagram of a diagnostic application 432 running on a remote computer 422. Pressure data and real time clock reading from a pressure transmitter are provided on line 320 from a network 316.

A first algorithm 440 stored in computer 422 calculates a difference between the series of digital pressure data points received from network 316 and a moving average of the series of digital pressure data points. Real time clock readings associated with each digital pressure data point are used to ensure that the digital pressure data points, which may be delayed or out of order after passing through network 316, are reassembled in a correct time sequence at the input to algorithm 440. The difference calculated in algorithm 440 is coupled along line 442 to a second algorithm 444.

The second algorithm 444 is also stored in the computer 422. The second algorithm 444 receives the difference calculated by algorithm 440 and calculates a trained data set of historical data during a training mode and calculates a current data set during a monitoring mode and generates diagnostic data 446 as a function of the current data set relative to the historical data indicating changes in the condition of the pressure generator (not illustrated in FIG. 4).

A third algorithm 448 receives the diagnostic data 446 and generates a report 450 indicating the diagnostic data to a user. The report 450, as explained above, can take forms such as a monitor display or a printed report.

FIG. 5 is a block diagram of a diagnostic application running on a remote computer 522 that diagnoses the condition of impulse lines.

In FIG. 5, a difference (subtract moving average) algorithm 540 receives digital pressure data from network 516 via line 520 and generates difference data on line 542 representing a sensed pressure minus a moving average of the sensed pressure. A calculate algorithm 552 receives the difference data from line 542 and calculates a trained output 553 of historical data obtained during a training mode or time interval. After training, calculate algorithm 554 calculates a monitor output 555 of current data obtained during a monitoring mode or normal operation time of the fluid flow meter.

In FIG. 5, a diagnostic algorithm 556 receives the trained output 553 and the monitor output 555 and generates a diagnostic data output 558 indicating a current condition of the pressure generator relative to an historical condition. In FIG. 5, calculate algorithm 554 stores the historical data in memory for later use in the comparison.

In difference algorithm 540, the moving average is calculated according to the series in Eq. 1:

$$A_j = \sum_{k=0}^{m} (P_{j+k})(W_k) \qquad \text{Eq. 1}$$

where A is the moving average, P is a series of sequentially sensed pressure values, and W is a numerical weight for a sensed pressure value, m is a number of previous sensed pressure values in the series. Provision can also be made in difference circuit 540 to filter out spikes and other anomalies present in the sensed pressure. In FIG. 5, the historical data comprises statistical data, for example, the mean ($\mu$) and standard deviation ($\sigma$) of the difference output or other statistical measurements, and the diagnostic output 558 indicates impulse line plugging. The diagnostic application switches between a training mode when it is installed and a monitoring mode when it is in use measuring flow as illustrated by switch 550. The calculate algorithm 554 stores historical data in the training mode. The diagnostic data output 558 indicates a real time condition of the pressure generator.

In FIG. 5, statistical data, such as the mean $\mu$ and standard deviation $\sigma$, are calculated based on a relatively large number of data points or flow measurements. The corresponding sample statistical data, such as sample mean $\underline{X}$ and sample standard deviation s, are calculated from a relatively smaller number of data points. Typically, hundreds of data points are used to calculate statistical data such as $\mu$ and $\sigma$, while only about 10 data points are used to calculate sample statistical data such as $\underline{X}$ and s. The number of data points during monitoring is kept smaller in order to provide diagnostics that is real time, or completed in about 1 second. Diagnostic algorithm 556 indicates line plugging if the sample standard deviation s deviates from the standard deviation $\sigma$ by a preset amount, for example 10%.

FIG. 6 is a block diagram of a diagnostic application running on a remote computer 622 that diagnoses the condition of a primary flow element. The diagnostic application of FIG. 6 is arranged generally along the lines of the diagnostic application of FIG. 5. A difference algorithm 640 receives digital pressure data from network 616 via line 620. The diagnostic application switches between a training mode and a monitoring mode by switch 650.

In FIG. 6, the diagnostic output 658 indicates a condition of the primary element, while in FIG. 5, the diagnostic output 558 indicates a condition of the impulse lines. In FIG. 6, calculate algorithms 652, 654 calculate and store data on power spectral density (PSD) of the difference output on line 642 rather than statistical data which is used in FIG. 5.

The power spectral density data is preferably in the range of 0 to 100 Hertz. The center frequency of a bandpass filter can be swept across a selected range of frequencies to generate a continuous or quasi-continuous power spectral density as a function of frequency in a manner that is well known. Various known Fourier transforms can be used.

Power spectral density, Fi, can also be calculated using Welch's method of averaged periodograms for a given data set. The method uses a measurement sequence x(n) sampled at fs samples per second, where n=1, 2, ... N. A front end filter with a filter frequency less than fs/2 is used to reduce aliasing in the spectral calculations. The data set is divided into $F_{k,i}$ as shown in Eq. 2:

$$F_{k,i} = (1/M) \left| \sum_{n=1}^{M} X_k(n) e^{-j2\pi i \Delta f n} \right|^2 \qquad \text{Eq. 2}$$

There are $F_{k,i}$ overlapping data segments and for each segment, a periodogram is calculated where M is the number of points in the current segment. After all periodograms for all segments are evaluated, all of them are averaged to calculate the power spectrum:

$$Fi = (1/L) \sum_{k=1}^{L} F_{k,i} \qquad \text{Eq. 3}$$

Once a power spectrum is obtained for a training mode, this sequence is stored in memory, preferably EEPROM, as the baseline power spectrum for comparison to real time power spectrums. Fi is thus the power spectrum sequence and i goes from 1 to N which is the total number of points in the original data sequence. N, usually a power of 2, also sets the frequency resolution of the spectrum estimation. Therefore, Fi is also known as the signal strength at the $i^{th}$ frequency. The power spectrum typically includes a large number points at predefined frequency intervals, defining a shape of the spectral power distribution as a function of frequency.

In the detection of the primary element degradation, a relatively larger sample of the spectral density at baseline historical conditions and a relatively smaller sample of the spectral density at monitoring conditions are compared. The relatively smaller sample allows for a real time indication of problems in about 1 second. An increase in the related frequency components of the power spectrum can indicate the degradation of the primary element. Using orifice plates as primary elements, for example, changes as high as 10% are observed in spectral components when the orifice plate is degraded to a predetermined level. The amount of change can be adjusted as needed, depending on the tolerable amount of degradation and the type of primary element in use. The amount of change needed to indicate a problem is arrived at experimentally for each type of primary element arrangement. Fuzzy logic can also be used to compare the many points of the power spectrums.

The pressure data is typically a calibrated output, and the diagnostic data indicates if the pressure generator is out of calibration.

Figure 7:
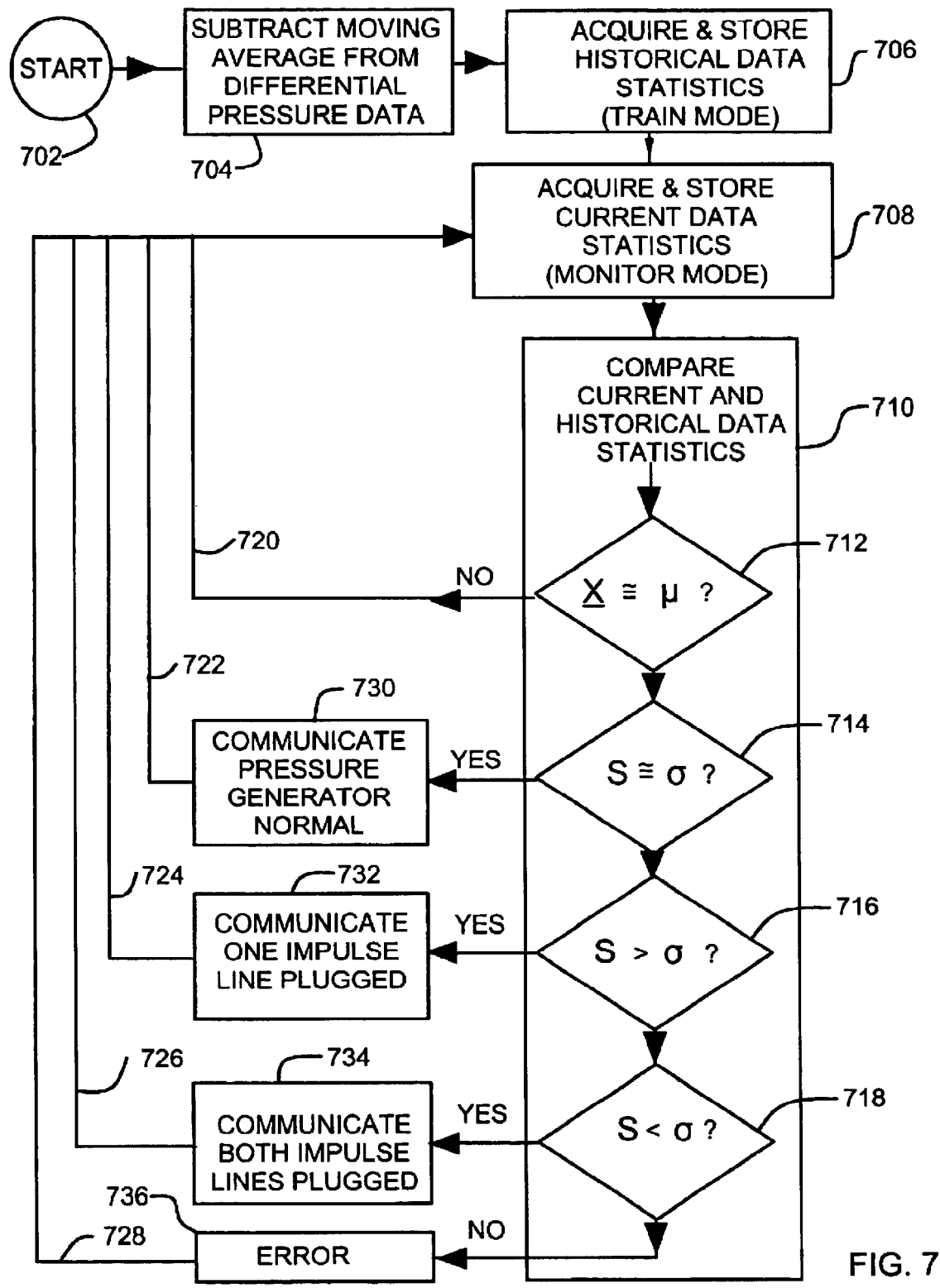
FIG. 7 is a flow chart of a process diagnosing the condition of impulse lines.

FIG. 7 is a detailed flow chart of a process diagnosing the condition of impulse lines.

The algorithm starts at 702. A moving average is subtracted from differential pressure data as shown at 704 to calculate a difference. During a train mode, historical data on the calculated difference is acquired and stored at 706 as statistical data $\mu$ and $\sigma$, for example. During an operational MONITOR mode, current data on the difference is acquired and stored at 708 as statistical data $\underline{X}$ and s. The smaller sample of current data is compared to the larger sample of the historical data to diagnose the condition of the impulse lines. Comparisons 710 of historical and current statistical data are made at 714, 716, 718 and a selected diagnostic output is generated at 730, 732, 734 as a function of the comparisons made at 712, 714, 716, 718 respectively.

After completion of any diagnostic output, the process loops back at 720, 722, 724, 726 or 728 to repeat the monitor mode diagnostics, or the transmitter can be shut down until maintenance is performed. If the diagnostic process itself fails, an error indication is provided on the diagnostic output at 736. In the method of diagnosis illustrated in FIG. 7, the historical data set comprises statistical data such as data on the mean ($\mu$) and standard deviation ($\sigma$) of the calculated difference; the current data set comprises current sample statistical data, such as the sample average ($\underline{X}$) and sample deviation (s) of the calculated difference. The sample deviation ($\sigma$) is compared to the standard deviation ($\sigma$) to diagnose impulse line plugging, for example. Other known statistical measures of uncertainty, or statistical measures developed experimentally to fit this application can also be used besides mean and standard deviation. When there is an unusual flow condition where $\underline{X}$ is much different than $\mu$, the diagnostics can be temporarily suspended as shown at 712 until usual flow conditions are reestablished. This helps to prevent false alarm indications.

In FIGS. 1–7, the transmitter generates a calibrated output and the flow diagnostic system generates a diagnostic output that indicates if the pressure generator is out of calibration. In FIGS. 1–7, the primary element can comprise, for example, a simple pitot tube or an averaging pitot tube as illustrated below in the example shown in FIG. 16. The primary element and impulse pipes can be combined in an integral orifice such as illustrated in FIGS. 2–3. An orifice plate adapted for clamping between pipe flanges is illustrated in FIG. 1. The primary element can comprise a venturi, a nozzle or an orifice (not illustrated). A standard arrangement of a pressure generator can be used with a flow diagnostic system that is adapted to provide the diagnostics outputs. The flow diagnostic system adapts itself to the characteristics of the pressure generator during the training mode and has a standard of comparison stored during the training mode that is available for comparison during the monitoring or operational mode. The standard of comparison can be adjusted as needed by a technician via the network. In each arrangement, the fluid flow meter provides a calibrated flow rate output and the diagnostic report indicates if the pressure generator is out of calibration.

Figure 8:
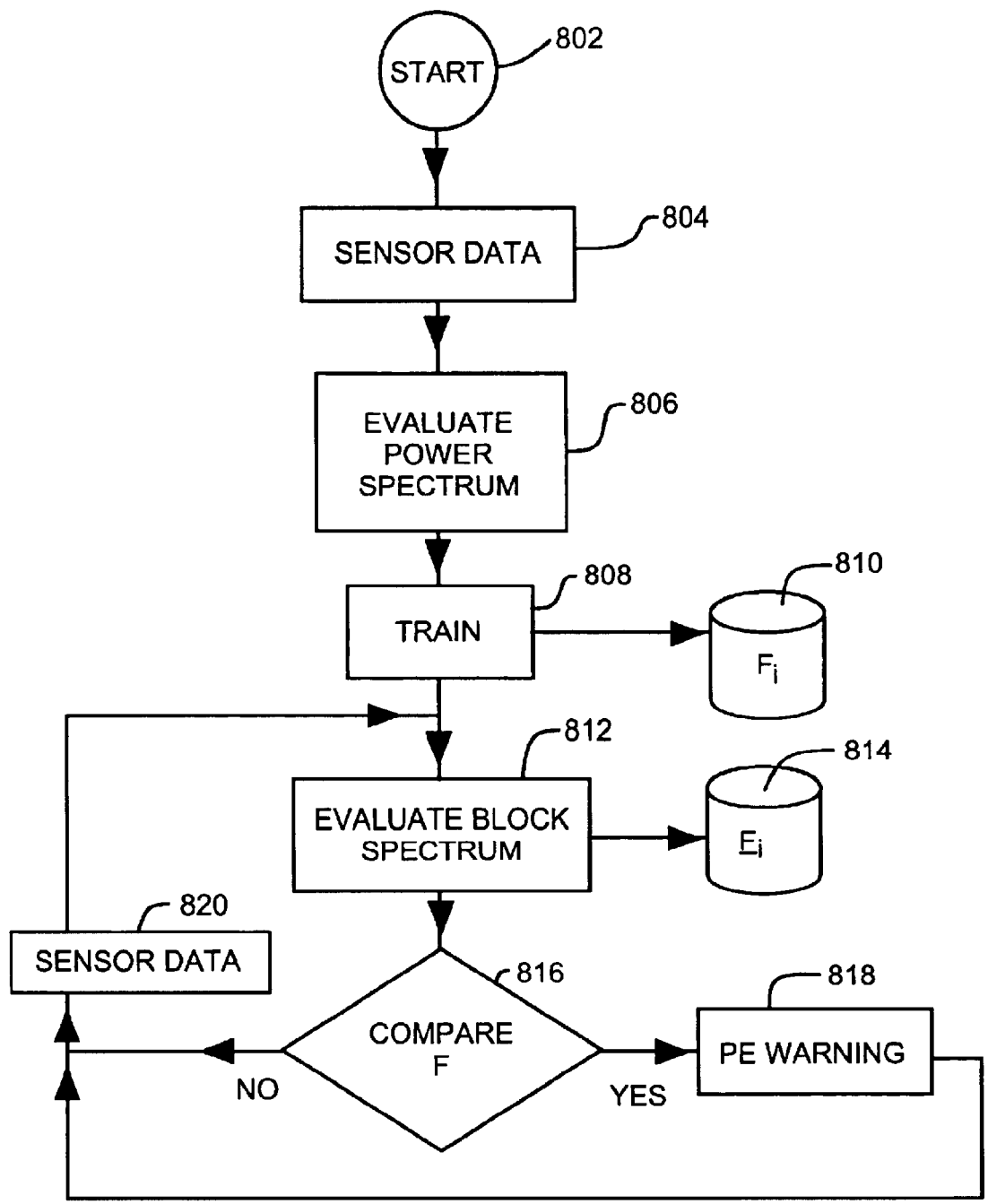
FIG. 8 is a flow chart of a process diagnosing the condition of a primary element.

FIG. 8 is a flow chart of a process diagnosing the condition of a primary element.

The condition of the primary element can include erosion or fouling of the primary element. The method or algorithm starts at 802. Digital pressure data is gathered in a training mode or time interval as shown at 804. A power spectrum of the sensor data, minus the moving average, is calculated at 806. The power spectrum obtained is identified as the training power spectrum at 808 and stored in non-volatile memory 810. After completion of training, the process moves on to monitoring or normal use. A further power spectrum of current pressure data, minus the moving average, is evaluated at 812, and the power spectrum so obtained in stored in memory 814, that can be either RAM or nonvolatile memory. At 816, the power spectrum Fi obtained during training is compared to the power spectrum $\underline{Fi}$ obtained during monitoring. If there is a significant difference between Fi and $\underline{Fi}$ which is indicative of a problem with the primary element, a primary element warning (PE Warning) is generated as shown at 818. If the power spectrums Fi and $\underline{Fi}$ are sufficiently similar, then no primary element warning is generated. After the comparison at 816 and generation of a PE Warning, as needed, program flow moves to obtain new real time pressure data at 820 and the monitoring process moves on to a new evaluation at 812, or the flow meter can shut down when there is a PE warning. The process in FIG. 8 can loop continuously in the monitoring mode to provide real time information concerning the condition of the primary element.

Figure 9:
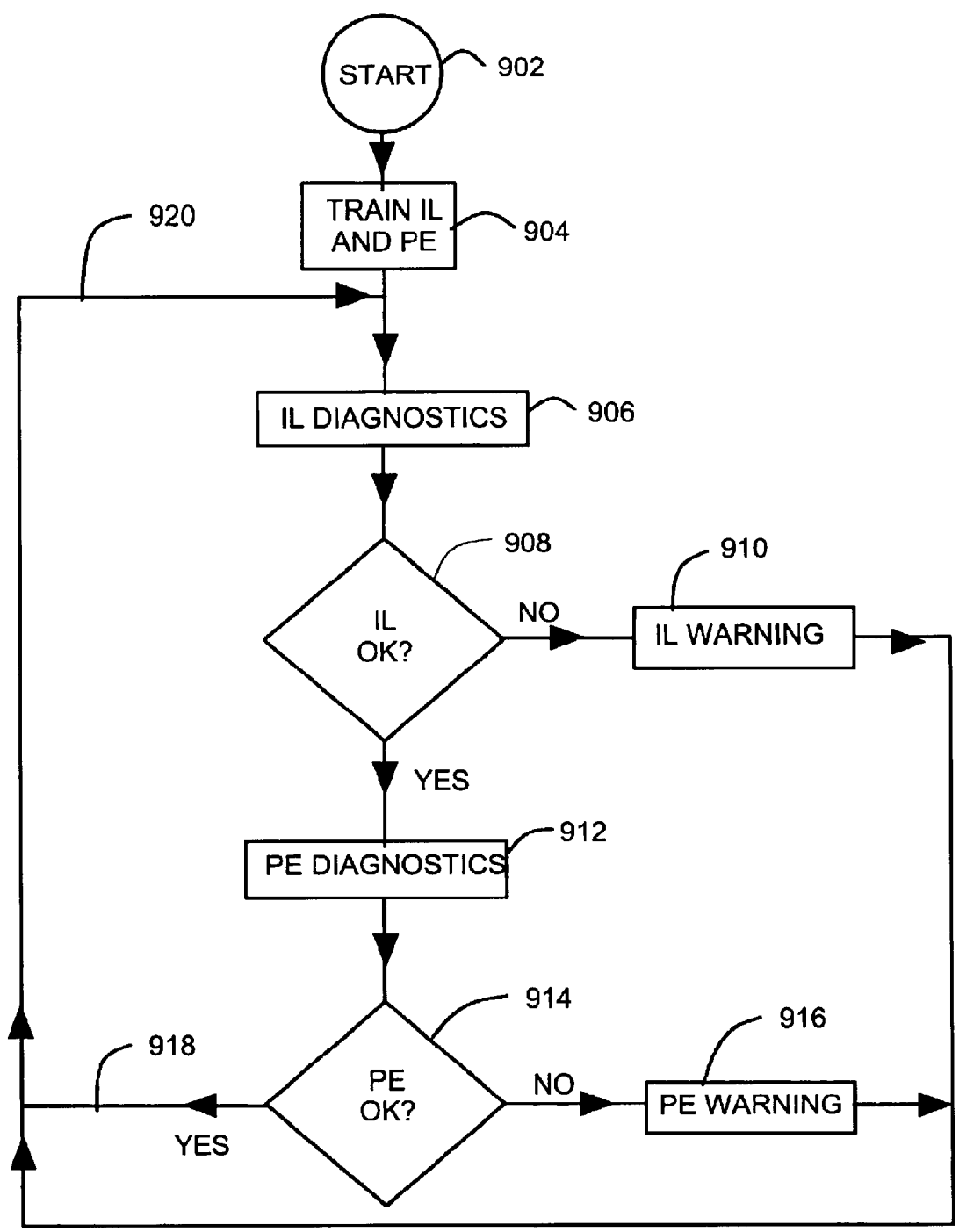
FIG. 9 is a flow chart of a process of diagnosing the condition of both impulse lines and a primary element.

In FIG. 9, a flow chart illustrates a process that provides diagnosis of both primary element (PE) and impulse lines (IL). Program flow starts at 902. During a training mode illustrated at 904, pressure data, minus a moving average, is obtained and training power spectrum and training statistics are stored in nonvolatile memory as explained above. Next, impulse line diagnostics (such as those explained in FIG. 7) are performed at step 906 in FIG. 9. In FIG. 9, after impulse line diagnostics are performed, current impulse line statistics are compared to historical (training) impulse line statistics (as detailed in FIG. 7) at 908. If the comparison indicates a problem with plugging of impulse lines, then an impulse line warning is generated as shown at 910. If no problem with the impulse lines is apparent, then program flow moves on to primary element (PE) diagnostics at 912.

At process 912, power spectral density for the current real time data is calculated (as explained above in connection with FIG. 8). The current power spectral density is compared to the historical power spectral density at 914, and if there is a difference large enough to indicate a problem with the primary element, then a PE Warning is generated as shown at 916. If the differences in the power spectral densities are small, then no PE warning is generated as shown at 918. Program flow continues on at 920 to repeat the IL and PE diagnostics, or the flow meter can be shut down if there is a PE or IL warning until maintenance is performed.

Any of the methods can be stored on a computer-readable medium as a plurality of sequences of instructions, the plurality of sequences of instructions including sequences that, when executed by a diagnostic application in a flow diagnostic system, cause the flow diagnostic system to perform a diagnostic method relative to a primary element and impulse lines coupled to the transmitter.

The flow diagnostics system can also be used with a transmitter (not illustrated) which includes remote seals connected by flexible capillary tubes that are filled with a controlled quantity of isolation fluid such as silicone oil. The isolator arrangement permits the transmitter electronics to be spaced away from extremely hot process fluids which contact the remote seals. The flow diagnostics system can also be used to detect leaking and pinching off of capillary tubes using the diagnostic techniques described above to provide diagnostic data.

The flow diagnostics system can also be used with a transmitter (not illustrated) which connects to taps near the bottom and top of a tank. The transmitter provides an output that represents a time integral of flow in and out of the tank. The transmitter includes circuitry, or alternatively software, that measures the differential pressure between the taps and computes the integrated flow as a function of the sensed differential pressure and a formula stored in the transmitter relating the sensed pressure to the quantity of fluid in the tank. This formula is typically called a strapping function and the quantity of fluid which has flowed into or out of the tank can be integrated as either volumetric or mass flow, depending on the strapping function stored in transmitter. The transmitter can be located either near the bottom or the top of tank, with a tube going to the other end of the tank, often called a "leg." This leg can be either a wet leg filled with the fluid in the tank, or a dry leg filled with gas. Remote seals can also be used with such a transmitter.

In one embodiment, the flow diagnostic system includes a signal preprocessor algorithm that isolates signal components in the pressure data such as frequencies, amplitudes or signal characteristics which are related to a plugged impulse line or degraded primary element. The signal preprocessor provides an output to a signal evaluator in the difference algorithm. The signal preprocessor isolates a portion of the signal by filtering, performing a wavelet transform, performing a Fourier transform, use of a neural network, statistical analysis, or other signal evaluation techniques. Such preprocessing is preferably implemented in the difference algorithm or in a specialized digital signal processor.

Figure 10:
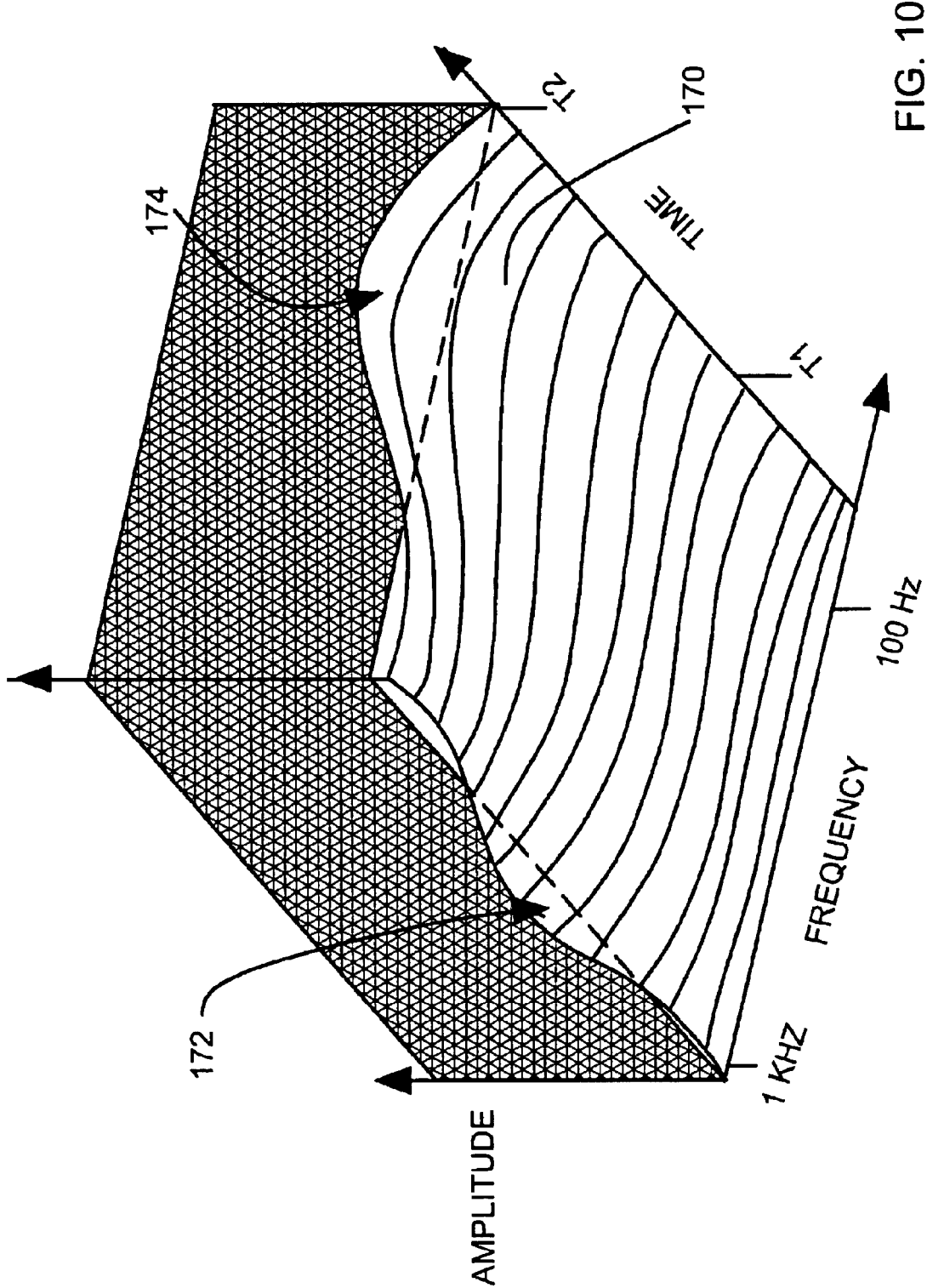
FIG. 10 is a graph of amplitude versus frequency versus time of a process variable signal.
Figure 11:
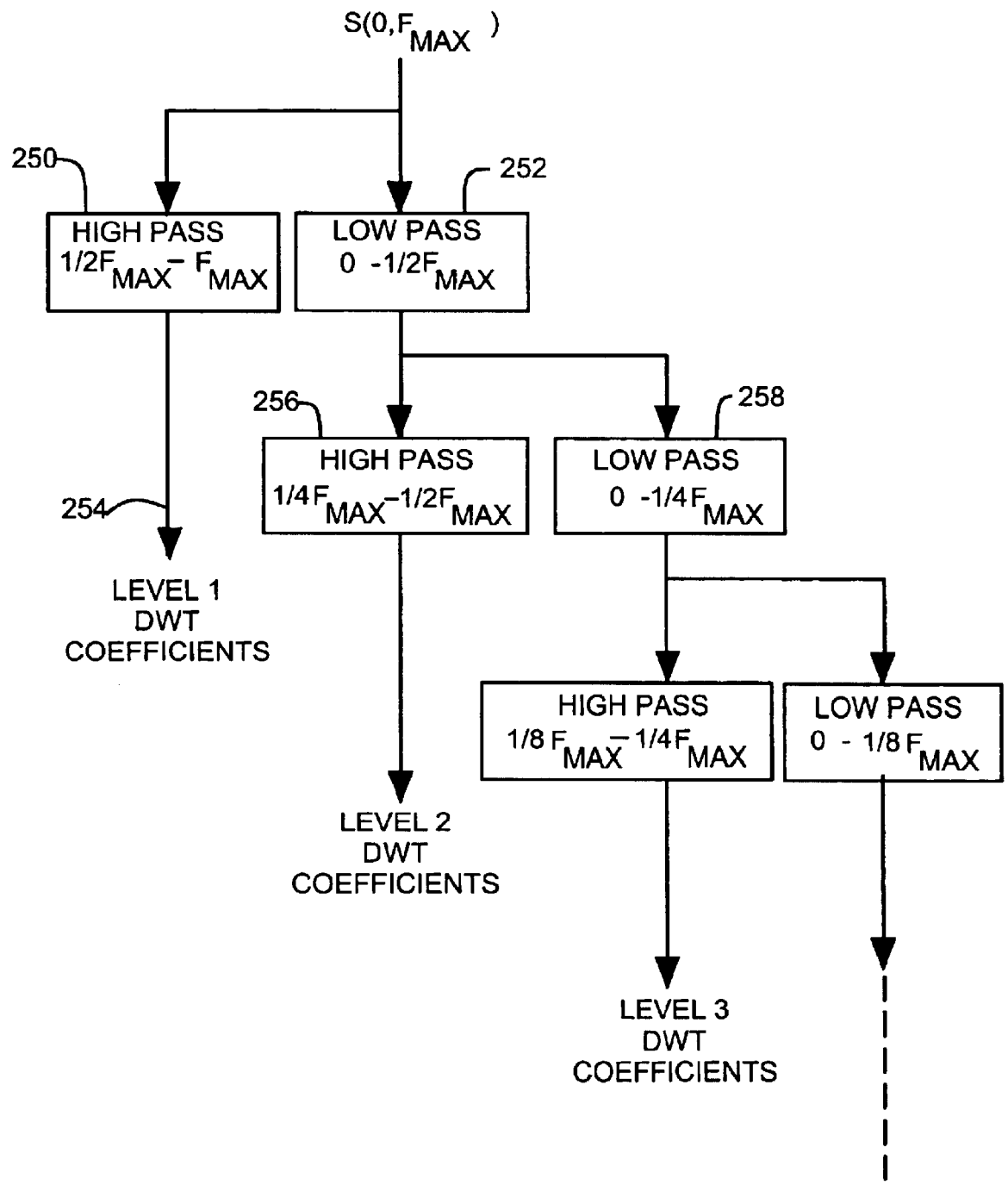
FIG. 11 is a block diagram of a discrete wavelet transformation.
Figure 12:
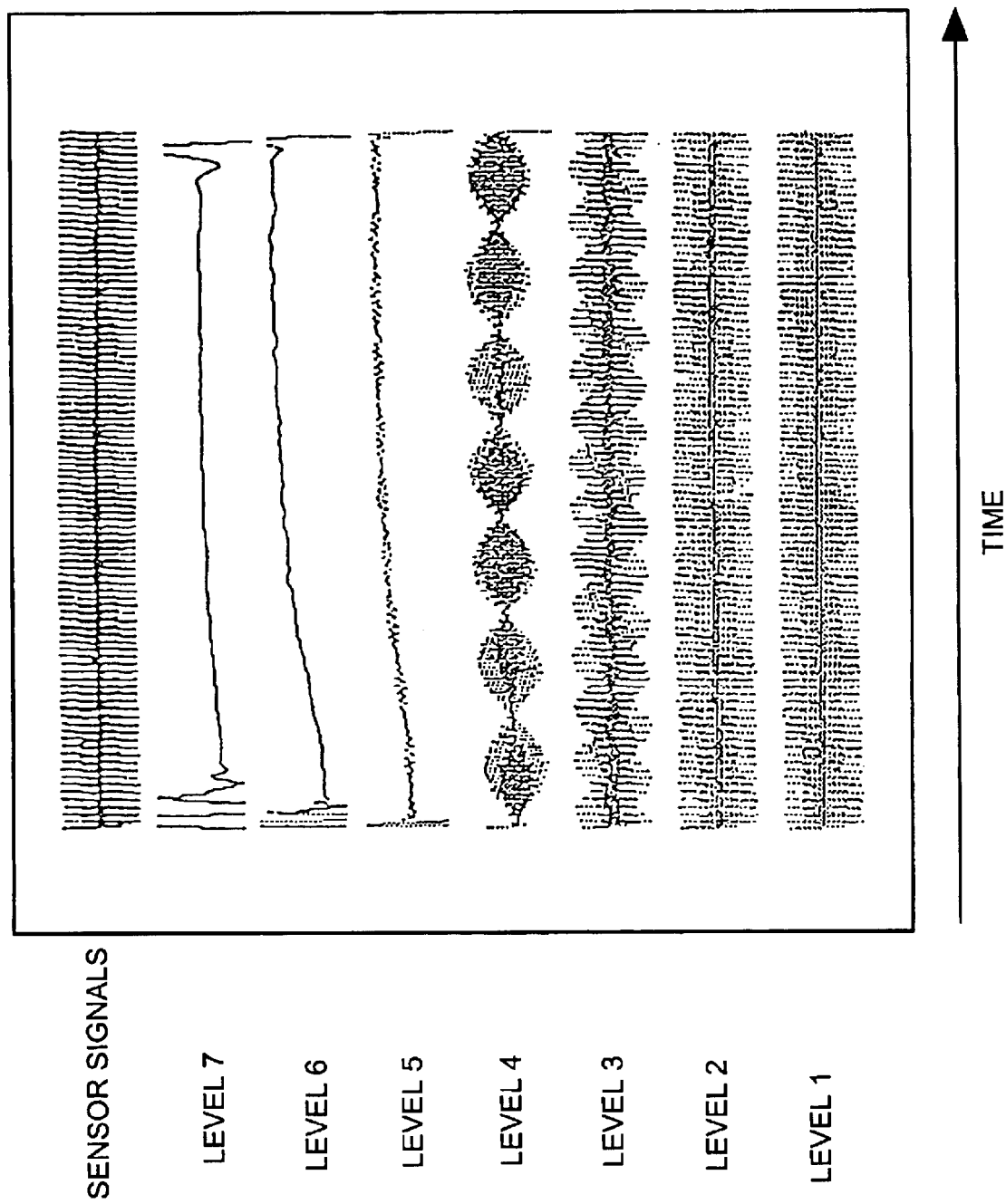
FIG. 12 is a graph showing signals output from a discrete wavelet transformation.

The signal components are isolated through signal processing techniques in which only desired frequencies or other signal characteristics such as amplitude are identified and an indication of their identification is provided. Depending upon the strength signals to be detected and their frequency, signal preprocessor can comprise a filter, for example a band pass filter, to generate the isolated signal output. For more sensitive isolation, advanced signal processing techniques are utilized such as a Fast Fourier transform (FFT) to obtain the spectrum of the sensor signal. In one preferred embodiment, the signal preprocessor comprises a wavelet processor which performs a wavelet analysis on the sensor signal as shown in FIGS. 10, 11 and 12 using a discrete wavelet transform. Wavelet analysis is well suited for analyzing signals which have transients or other non-stationary characteristics in the time domain. In contrast to Fourier transforms, wavelet analysis retains information in the time domain, i.e., when the event occurred.

Wavelet analysis is a technique for transforming a time domain signal into the frequency domain which, like a Fourier transformation, allows the frequency components to be identified. However, unlike a Fourier transformation, in a wavelet transformation the output includes information related to time. This may be expressed in the form of a three dimensional graph with time shown on one axis, frequency on a second axis and signal amplitude on a third axis. A discussion of wavelet analysis is given in *On-Line Tool Condition Monitoring System With Wavelet Fuzzy Neural Network*, by L. Xiaoli et al., B JOURNAL OF INTELLIGENT MANUFACTURING pgs. 271–276 (1997). In performing a continuous wavelet transformation, a portion of the sensor signal is windowed and convolved with a wavelet function. This convolution is performed by superimposing the wavelet function at the beginning of a sample, multiplying the wavelet function with the signal and then integrating the result over the sample period. The result of the integration is scaled and provides the first value for continuous wavelet transform at time equals zero. This point may be then mapped onto a three dimensional plane. The wavelet function is then shifted right (forward in time) and the multiplication and integration steps are repeated to obtain another set of data points which are mapped onto the 3-D space. This process is repeated and the wavelet is moved (convolved) through the entire signal. The wavelet function is then scaled, which changes the frequency resolution of the transformation, and the above steps are repeated.

FIG. 10 is a graph of amplitude versus frequency versus time of a process variable signal such as the pressure data reading from a pressure transmitter. Data from a wavelet transformation of digital pressure data is shown in FIG. 10. The data is graphed in three dimensions and forms a surface 170. As shown in the graph of FIG. 10, the digital pressure data includes a small signal peak 172 at about 1 kHz at time $t_1$, and another peak 174 at about 100 Hz at time $t_2$. Through subsequent processing by the signal evaluator, surface 170 or portions of surface 170 are evaluated to determine impulse piping or primary element degradation.

The continuous wavelet transformation described above requires extensive computations. Therefore, in one embodiment, a discrete wavelet transform (DWT) which is well suited for real time implementation in a control system or personal computer is performed. One efficient discrete wavelet transform uses the Mallat algorithm which is a two channel sub-band coder. The Mallet algorithm provides a series of separated or decomposed signals which are representative of individual frequency components of the original signal.

FIG. 11 is a block diagram of a discrete wavelet transformation. FIG. 11 illustrates an example in which an original set of digital pressure data or signal S is decomposed using a sub-band coder of a Mallet algorithm. The signal S has a frequency range from 0 to a maximum of $f_{MAX}$. The signal is passed simultaneously through a first high pass filter 250 having a frequency range from ½ $f_{MAX}$ to $f_{MAX}$, and a low pass filter 252 having a frequency range from 0 to ½ $f_{MAX}$. This process is called decomposition. The output from the high pass filter provides "level 1" discrete wavelet transform coefficients 254. The "level 1" coefficients 254 represent the amplitude as a function of time of that portion of the input signal which is between ½ $f_{MAX}$ and $f_{MAX}$. The output from the 0–1/2 $f_{MAX}$ low pass filter 252 is passed through subsequent high pass (¼ $f_{MAX}$–½ $f_{MAX}$) filter 256 and low pass (0–¼ $f_{MAX}$) filter 258, as desired, to provide additional levels (beyond "level 1") of discrete wavelet transform coefficients. The outputs from each low pass filter can be subjected to further decompositions offering additional levels of discrete wavelet transformation coefficients as desired. This process continues until the desired resolution is achieved or the number of remaining data samples after a decomposition yields no additional information. The resolution of the wavelet transform is chosen to be approximately the same as the sensor or the same as the minimum signal resolution required to monitor the signal. Each level of DWT coefficients is representative of signal amplitude as a function of time for a given frequency range. Coefficients for each frequency range are concatenated to form a graph such as that shown in FIG. 10.

In some embodiments, padding is added to the signal by adding data to the sensor signal near the borders of windows used in the wavelet analysis. This padding reduces distortions in the frequency domain output. This technique can be used with a continuous wavelet transform or a discrete wavelet transform. "Padding" is defined as appending extra data on either side of the current active data window, for example, extra data points are added which extend 25% of the current window beyond either window edge. In one embodiment, the padding is generated by repeating a portion of the data in the current window so that the added data "pads" the existing signal on either side. The entire data set is then fit to a quadratic equation which is used to extrapolate the signal 25% beyond the active data window.

FIG. 12 is a graph showing signals output from a discrete wavelet transformation (DWT) such as that shown in FIG. 11. FIG. 12 illustrates an example showing a signal S generated by a pressure transmitter and the resultant approximation signals yielded in seven decomposition levels labeled level 1 through level 7. In this example, signal level 7 is representative of the lowest frequency DWT coefficient which can be generated. Any further decomposition yields noise. All levels, or only those levels which relate impulse piping or primary element degradation are provided.

The algorithm evaluates the isolated signal received from the signal preprocessing and in one embodiment, monitors an amplitude of a certain frequency or range of frequencies identified and provides a diagnostic output if a threshold is exceeded. Signal evaluator can also comprise more advanced decision making algorithms such as fuzzy logic, neural networks, expert systems, rule based systems, etc. Commonly assigned U.S. patent application Ser. No. 08/623,569 describes various decision making systems which can be implemented in a signal evaluator and is incorporated herein by reference.

The diagnostic application performs diagnostics related to the impulse piping or primary element using information derived from a differential pressure sensor. The following describes a number of embodiments for realizing a diagnostic application. The diagnostic application can provide a residual lifetime estimate, an indication of a failure, an indication of an impending failure or a calibration output which is used to correct for errors in the sensed process variable.

A. Polynomial Curvefit

In one embodiment of the present invention empirical models or polynomial curve-fitting are used to detect line plugging or primary element degradation. A polynomial-like equation which has a combination of input signals such as various statistical parameters can be used to detect primary element degradation or impulse line plugging. Constants for the equations can be stored in a memory or received over the network.

B. Neural Networks

The signal can be analyzed using a neural network. One such neural network is a multi-layer neural network. Although a number of training algorithms can be used to develop a neural network model for different goals. One embodiment includes the known Backpropagation Network (BPN) to develop neural network modules which will capture the nonlinear relationship among a set of input and output(s).

Figure 13:
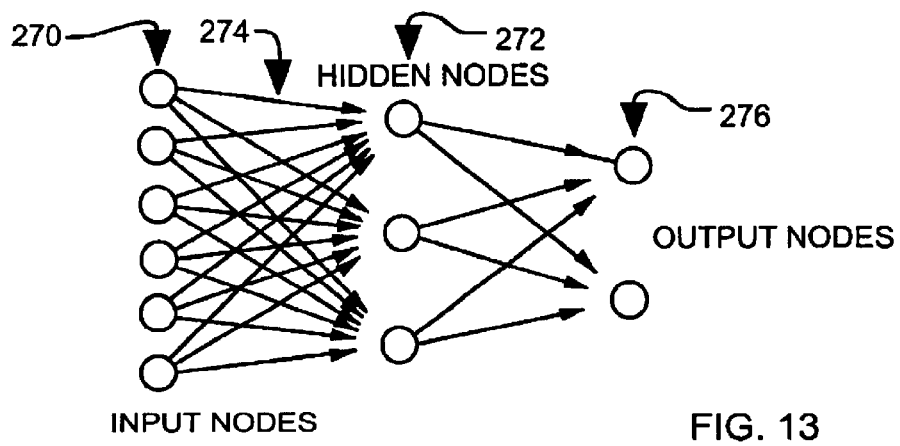
FIG. 13 is a diagram showing a simplified neural network.

FIG. 13 is a diagram showing a simplified neural network. FIG. 13 illustrates a typical topology of a three-layer neural network architecture that can be implemented in the diagnostic application. The first layer 270, usually referred to as the input buffer, receives the information, and feeds them into the inner layers. The second layer, in a three-layer network, commonly known as a hidden layer 272, receives the information from the input layer, modified by the weights on the connections 274 and propagates this information forward. This is illustrated in the hidden layer 272 which is used to characterize the nonlinear properties of the system analyzed. The last layer is the output layer 276 where the calculated outputs (estimations) are presented to the environment.

Figure 14:
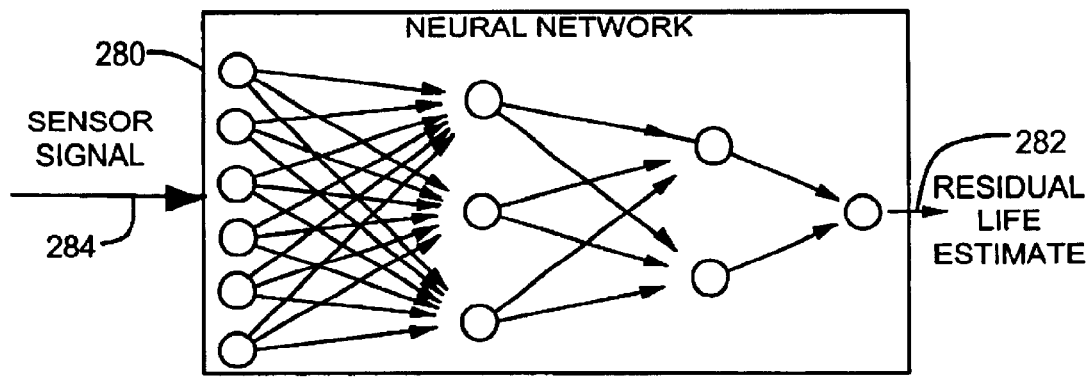
FIG. 14 is a diagram showing a neural network used to provide a residual lifetime estimate.

FIG. 14 is a diagram showing a neural network 280 used to provide a residual lifetime estimate. FIG. 14 illustrates a schematic of a neural network which provides a residual life estimate 282 for a primary element or impulse pipe based upon a sensor (transmitter) signal 284. The sensor signal can be either a raw sensor signal or a sensor signal which has been processed through signal processing techniques.

Figure 15:
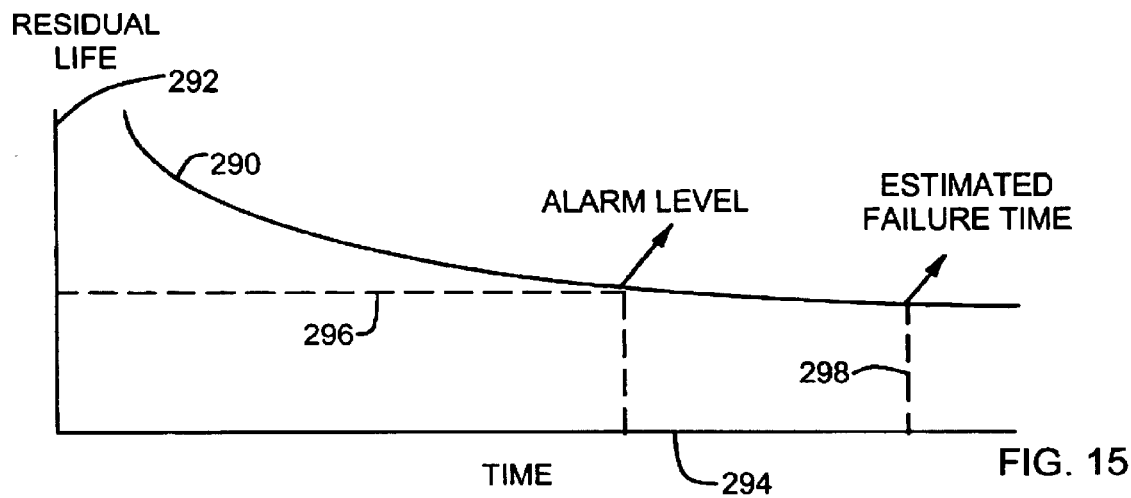
FIG. 15 is a graph of residual life versus time.

FIG. 15 is a graph 290 of residual life 292 versus time 294. FIG. 15 illustrates a graph of residual life versus time and shows that an alarm level 296 can be set prior to an estimated failure time 298. This allows the system to provide an alarm output prior to actual failure of the device.

C. Threshold Circuitry

This embodiment uses a set of if-then rules to reach a conclusion on the status of the impulse piping or primary element. This embodiment may be implemented easily in analog or digital circuitry. For example, with a simple rule, if the signal drops a certain amount below a historical mean, an output can be provided which indicates that an impulse line is plugged or is in the process of becoming plugged. Of course, more complex rules can be used which use multiple statistical parameters or signal components of the sensor signal to provide more accurate or different information.

D. Wavelets

With this embodiment, one or more of the decomposition signal(s) in a wavelet analysis directly relate to line plugging and are used to diagnose the transmitter.

Figure 16:
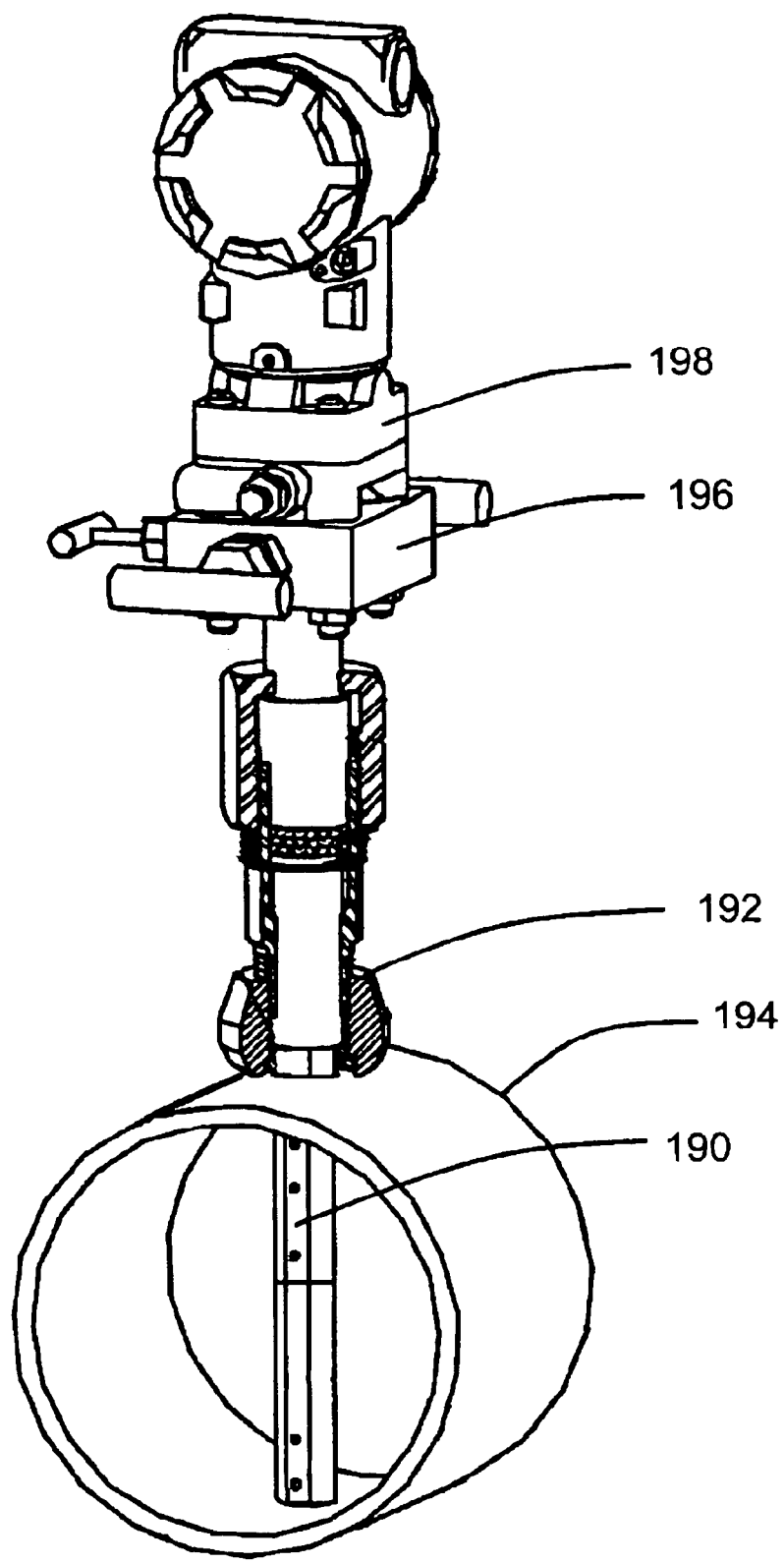
FIG. 16 illustrates a diagnostic fluid flow meter that has a pitot tube for a primary element.

FIG. 16 illustrates a diagnostic fluid flow meter that has a pitot tube for a primary element. The primary element can comprise a simple pitot tube or an averaging pitot tube as illustrated. The pitot tube 190 can be inserted through a tap 192 on a pipe 194. An instrument manifold 196 can couple between the pressure generator (including pitot inlets and impulse pipes internal to the pitot tube 190) and a pressure transmitter 198.

Figure 17:
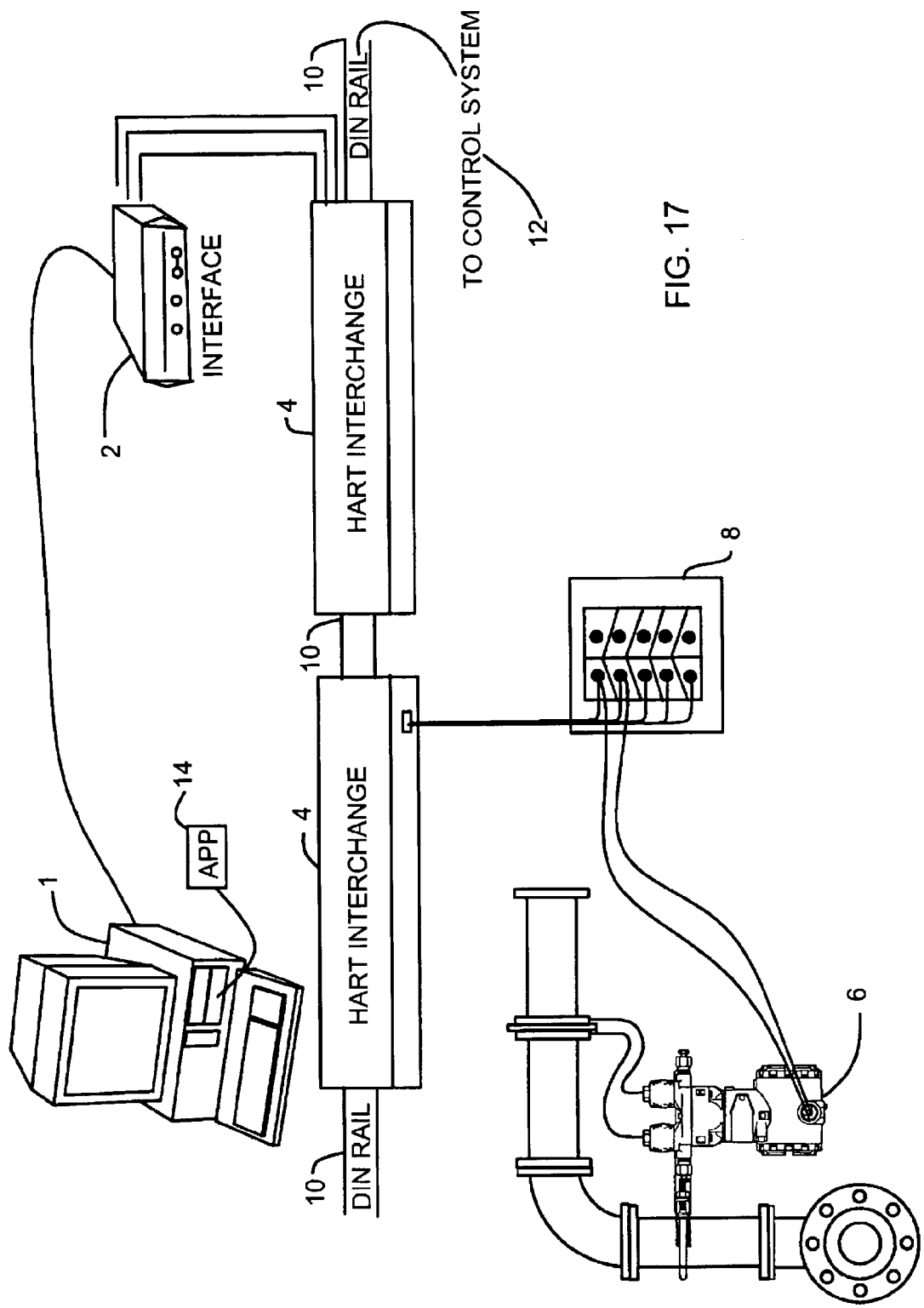
FIG. 17 illustrates a block diagram of a computer platform communicating with a transmitter via a field network.

FIG. 17 illustrates a computer platform 1 that connects via an interface 2 to one of several Hart interchange Devices 4. Interface 2 can be an RS232–RS485 converter, an ethernet connection, an intranet or internet connection, or other suitable interface that communicates information to the computer platform 1. The computer platform 1 is typically a personal computer located in a maintenance shop area that includes application software such as an Asset Management Solutions (AMS) software application from Rosemount Inc. Each Hart interchange devices 4 couples to one or more pressure transmitters 6 via a termination panel 8. The Hart interchange devices 4 are coupled via a DIN rail or bus 10 to a control system 12. A diagnostic application 14 as described above in connection with FIGS. 1–16 also resides on computer platform 1. Computer platform 1 provides a diagnostic report as explained above. The arrangement illustrated in FIG. 17 allows substantially all of the diagnostic software to run on computer platform 1 (which is a small control system) rather than place additional overhead on control system 12. The term "control system" as used in this application includes control systems such as control system 112 in FIG. 1 which provide electrical feedback to a fluid processing plant as well as computers that perform a monitoring function such as computer platform 1, where the feedback to the fluid processing plant comprises human intervention based on a diagnostic report generated by the computer platform 1.

Although the present invention has been described with reference to preferred embodiments, workers skilled in the art will recognize that changes can be made in form and detail without departing from the spirit and scope of the invention. For example, various function blocks of the invention have been described in terms of algorithms, however, many function blocks may be implemented in other forms such as digital and analog circuits, software and their hybrids. When implemented in software, a processor performs the functions and the signals comprise digital values on which the software operates. A general purpose processor programmed with instructions that cause the processor to perform the desired process elements, application specific hardware components that contain circuit wired to perform the desired elements and any combination of programming a general purpose processor and hardware components can be used. Deterministic or fuzzy logic techniques can be used as needed to make decisions in the circuitry or software. Because of the nature of complex digital circuitry, circuit elements may not be partitioned into separate blocks as shown, but components used for various functional blocks can be intermingled and shared. Likewise with software, some instructions can be shared as part of several functions and be intermingled with unrelated instructions within the scope of the invention.

What is claimed is:

1. A flow diagnostic system adapted to couple to a primary flow sensing element via impulse lines, the flow diagnostic system comprising:

a pressure transmitter coupled to the impulse lines and generating digital pressure data representing pressure;

a control system receiving the pressure data and providing the pressure data to a diagnostic application stored in the flow diagnostic system, the diagnostic application including:

a first algorithm calculating a difference between the pressure data and a moving average of the pressure data, the moving average based upon weighted pressure data, and a second algorithm receiving the difference and calculating a trained data set of historical pressure data during a training mode and calculating a current pressure data set during a monitoring mode, the set of historical pressure data comprising statistical data as a function of the difference and the current pressure data set comprising statistical data calculated as a function of the difference, and the second algorithm further generating diagnostic data as a function of the current pressure data set relative to the set of historical pressure data indicating changes in a condition of flow sensing, and a third algorithm generating a report indicating the diagnostic data.

2. The flow diagnostic system of claim 1 wherein the diagnostic application is stored in the control system.

3. The flow diagnostic system of claim 2 further comprising a network coupled to the control system, and the network provides the diagnostic application to the control system.

4. The flow diagnostic system of claim 3 wherein the network includes an application service provider (ASP), and the ASP provides the diagnostic application to the control system via the network.

5. The flow diagnostic system of claim 3 wherein the pressure data is temporarily stored in the control system and later coupled via the network to the diagnostic application.

6. The flow diagnostic system of claim 1 further comprising an application service provider (ASP) wherein the control system provides the pressure data to the ASP, and the diagnostic application is stored in the ASP.

7. The flow diagnostic system of claim 1 wherein the pressure transmitter provides real time clock readings to the control system.

8. The flow diagnostic system of claim 1 wherein the control system generates real time clock readings.

9. The flow diagnostic system of claim 1 further comprising a remote computer wherein the control system provides the pressure data to the remote computer, and the diagnostic application is stored in the remote computer.

10. The flow diagnostic system of claim 1 wherein the moving average is calculated according to the series $$A_j = \sum_{k=0}^{m} (P_{j+k})(W_k)$$

where A is the moving average, P is a series of sensed pressure values, and W is a weight for a sensed pressure value, m is a number of previous sensed pressure values in the series.

11. The flow diagnostic system of claim 1 wherein the diagnostic data indicates a real time condition of a pressure generator including a primary element and impulse lines.

12. The flow diagnostic system of claim 1 wherein the diagnostic data indicates a condition of the primary flow element.

13. The flow diagnostic system of claim 1 wherein the diagnostic data indicates a condition of the impulse lines.

14. The flow diagnostic system of claim 1 wherein the pressure data comprises a calibrated output, and the diagnostic data indicates if a pressure generator including a primary element and impulse lines is out of calibration.

15. The flow diagnostic system of claim 1 wherein the trained data set of historical data comprises power spectral density of the difference.

16. The flow diagnostic system of claim 15 wherein the power spectral density data is in the range of 0 to 100 Hertz.

17. The flow diagnostic system of claim 1 wherein the pressure transmitter is adapted to couple to a pitot tube primary flow element.

18. The flow diagnostic system of claim 17 wherein the pitot tube is an averaging pitot tube.

19. The flow diagnostic system of claim 17 further comprising an instrument manifold coupled between the pressure transmitter and a pressure generator comprising a primary element and impulse lines.

20. The flow diagnostic system of claim 1 wherein the primary flow sensing element and impulse lines are combined in an integral orifice.

21. The flow diagnostic system of claim 1 wherein the pressure transmitter is adapted to couple to a venturi primary flow element.

22. The flow diagnostic system of claim 1 wherein the pressure transmitter is adapted to couple to a nozzle primary flow element.

23. The flow diagnostic system of claim 1 wherein the pressure transmitter is adapted to couple to an orifice primary flow element adapted for clamping between pipe flanges.

24. The flow diagnostic system of claim 1 further comprising a signal preprocessor algorithm that provides an output to a signal evaluator in the first algorithm.

25. The flow diagnostic system of claim 24 wherein the signal preprocessing algorithm utilizes a processing algorithm selected from the group of wavelet transformation, Fourier transformation, neural networks, and statistical analysis.

26. The flow diagnostic system of claim 24 wherein the signal preprocessing algorithm is implemented in the first algorithm.

27. A computer-readable medium having stored thereon instructions executable by a flow diagnostic system to cause the flow diagnostic system to perform a diagnostic operation relative to a primary element and impulse lines couplable to a pressure transmitter, the instructions comprising:

calculating a difference between a pressure sensed by the pressure transmitter and a moving average of the sensed pressure, the moving average based upon weighted pressure data;

acquiring and storing an historical data set of the calculated difference during a training mode of the flow diagnostic system, the historical data comprising statistical data calculated as a function of the difference;

acquiring and storing a current data set of the calculated difference during a monitoring mode of the flow diagnostic system, the current data comprising statistical data calculated as a function of the difference;

comparing the current data set to the historical data set to diagnose the condition of one of the group consisting of the primary element and impulse lines;

generating a diagnostic report indicating the condition of one of the group consisting of the primary element and impulse lines.

28. The method of claim 27 wherein the step of comparing includes performing a fuzzy logic operation.

29. The method of claim 27 wherein the step of acquiring and storing a current data set comprises calculating standard deviation.

30. The method of claim 27 wherein the flow diagnostic system comprises a differential pressure transmitter.

31. The method of claim 27 wherein the primary element is selected from the group of primary elements consisting of a venturi tube, flow nozzle and averaging pitot tube.

32. The method of claim 27 wherein the primary element comprises a substantially new primary element.

33. The method of claim 27 wherein the impulse liner comprises new impulse lines.

34. The method of claim 27 wherein the step of comparing implements an algorithm selected from the group of algorithms consisting of neural networks, fuzzy logic, wavelets and Fourier transforms.

35. The flow diagnostic system of claim 1 wherein the diagnostic data is indicative of an estimate of a residual lifetime.

36. The flow diagnostic system of claim 1 wherein the diagnostic data is indicative of a failure of a residual lifetime.

37. The flow diagnostic system of claim 1 wherein the diagnostic data is indicative of an impending failure of a residual lifetime.

38. The method of claim 27 wherein the diagnostic report provides a residual lifetime estimate.

39. The method of claim 27 wherein the diagnostic report is indicative of a failure.

40. The method of claim 27 wherein the diagnostic report is indicative of an impending failure.

* * * * *